United States Patent
Hwang et al.

(10) Patent No.: US 11,140,527 B2
(45) Date of Patent: Oct. 5, 2021

(54) DEVICE AND METHOD FOR V2X COMMUNICATION

(71) Applicant: LG ELECTRONICS INC., Seoul (KR)

(72) Inventors: Jaeho Hwang, Seoul (KR); Woosuk Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 66 days.

(21) Appl. No.: 16/476,260

(22) PCT Filed: Jan. 6, 2017

(86) PCT No.: PCT/KR2017/000206
§ 371 (c)(1),
(2) Date: Jul. 5, 2019

(87) PCT Pub. No.: WO2018/128205
PCT Pub. Date: Jul. 12, 2018

(65) Prior Publication Data
US 2019/0357026 A1    Nov. 21, 2019

(51) Int. Cl.
*H04W 4/40*     (2018.01)
*H04W 4/02*     (2018.01)
(Continued)

(52) U.S. Cl.
CPC ............ *H04W 4/40* (2018.02); *H04W 4/02* (2013.01); *H04W 4/12* (2013.01); *H04W 64/003* (2013.01); *H04W 80/06* (2013.01)

(58) Field of Classification Search
CPC .......... H04W 4/40; H04W 4/02; H04W 4/12; H04W 4/44; H04W 64/003; H04W 80/06;
(Continued)

(56) References Cited

U.S. PATENT DOCUMENTS 9,698,923 B2 * 7/2017 Posner ................. H04H 20/55
10,176,524 B1 * 1/2019 Brandmaier ........... G06Q 40/08
(Continued)

FOREIGN PATENT DOCUMENTS

CN     104507051     4/2015
JP     2000065585    3/2000
(Continued)

OTHER PUBLICATIONS

ETSI EN 302 637-3 V1.2.2 (Nov. 2014 )"Intelligent Transport Systems (ITS); Vehicular Communication; Basic Set of Applications; Part 3: Specifications of Decentralized Environmental Notification Basic Service" (Year: 2014).*
(Continued)

*Primary Examiner* — Edan Orgad
*Assistant Examiner* — Vanneilian Lalchinthang
(74) *Attorney, Agent, or Firm* — Lee, Hong, Degerman, Kang & Waimey

(57) ABSTRACT

Disclosed is a V2I message transmission method for a V2X communication device. The V2I message transmission method according to an embodiment of the present invention may comprise the steps of: generating a V2I message for providing V2I services, i.e., services between vehicles and infrastructure, wherein the V2I message includes a first container, which includes information commonly used for the V2I services, and a second container, which includes information used for a particular V2I service; subjecting the V2I message to network/transport layer processing; and generating a V2I message frame by subjecting the V2I message packet to physical layer processing. Herein, the first container may include message ID information indicating the identifier of the V2I message, event ID information indicating the identifier of an event, and reference position
(Continued)

information indicating a first reference position related to the event.

10 Claims, 35 Drawing Sheets

(51) Int. Cl.
*H04W 4/12* (2009.01)
*H04W 64/00* (2009.01)
*H04W 80/06* (2009.01)

(58) Field of Classification Search
CPC ..... H04L 7/0033; H04J 3/0638; H04J 3/0641; H04B 1/3822
USPC .......................................................... 370/329
See application file for complete search history.

(56) References Cited

U.S. PATENT DOCUMENTS

| | | | |
|---|---|---|---|
| 2014/0358414 A1* | 12/2014 | Ibrahim | G08G 1/0129 701/118 |
| 2017/0032402 A1* | 2/2017 | Patsiokas | G06Q 30/0261 |
| 2017/0195982 A1* | 7/2017 | Park | H04W 56/0015 |
| 2017/0251508 A1* | 8/2017 | Park | H04W 4/46 |
| 2018/0227726 A1* | 8/2018 | Futaki | H04W 4/46 |
| 2019/0266892 A1* | 8/2019 | Gunther | H04W 28/0252 |
| 2019/0327732 A1* | 10/2019 | Yoon | H04L 5/0094 |

FOREIGN PATENT DOCUMENTS

| | | |
|---|---|---|
| JP | 2011248864 | 12/2011 |
| KR | 20130043828 | 5/2013 |

OTHER PUBLICATIONS

ETSI TS102 637-3 V1.1.1 (Sep. 2010)"Intelligent Transport Systems (ITS); Vehicular Communications; Basic Set of Applications; Part 3: Specifications of Decentralized Environmental Notification Basic Service" (Year: 2010).*
PCT International Application No. PCT/KR2017/000206, International Search Report dated Sep. 28, 2017, 3 pages.
Lucas Wang, et al., "Data Naming in Vehicle-to-Vehicle Communications", IEEE Infocom 2012 Workshop on Emerging Design Choices in Name-Oriented Networking, (http://ieeexplore.ieee.org/document/6193515/), May 3, 2012, pp. 328-333, 8 pages.
Tiago Meireles, et al., "Wireless protocols to support vehicular safety applications", Universidade de Aveiro 2015, Department of Electronics, Telecommunications and Informatics (http://ria.ua.pt/handle/10773/16287), 166 pages.
European patent application No. 17889741.9, European search report dated Jun. 19, 2020, 8 pages.
Intelligent Transport Systems (ITS); Vehicular Communications; Basic Set of Applications; Part 3: Specifications of Decentralized Environmental Notification Basic Service; ETSI TS 102 637-3 v1.1.1 (Sep. 2010), 46 pages.
Japan Patent Office Application No. 2019-537093, Notice of Allowance dated Dec. 8, 2020, 3 pages.
"Development of Wireless Message for Vehicle-to-Intrastructure Safety Applications," 18AE-0171, Dec. 13, 2017, 8 pages.
Japan Patent Office Application No. 2019-537093, Office Action dated Jul. 28, 2020, 5 pages.
JARI S12-1 pp. 7-49 (Mar. 2013), 101 pages.
JARI S13-1 pp. 91-113 (Mar. 2014), 24 pages.
JARI p. 81(Mar. 2014), 2 pages.

* cited by examiner

[FIG. 1]
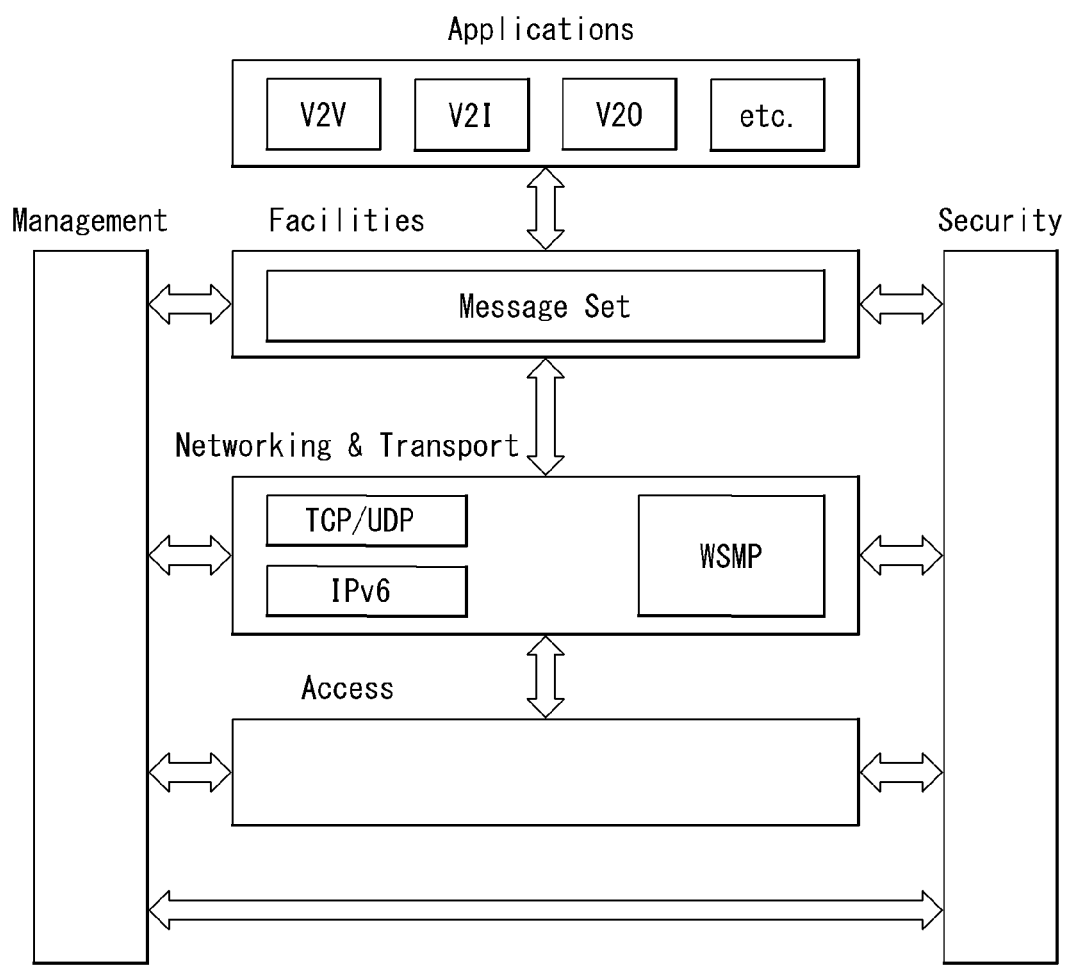

[FIG. 2]
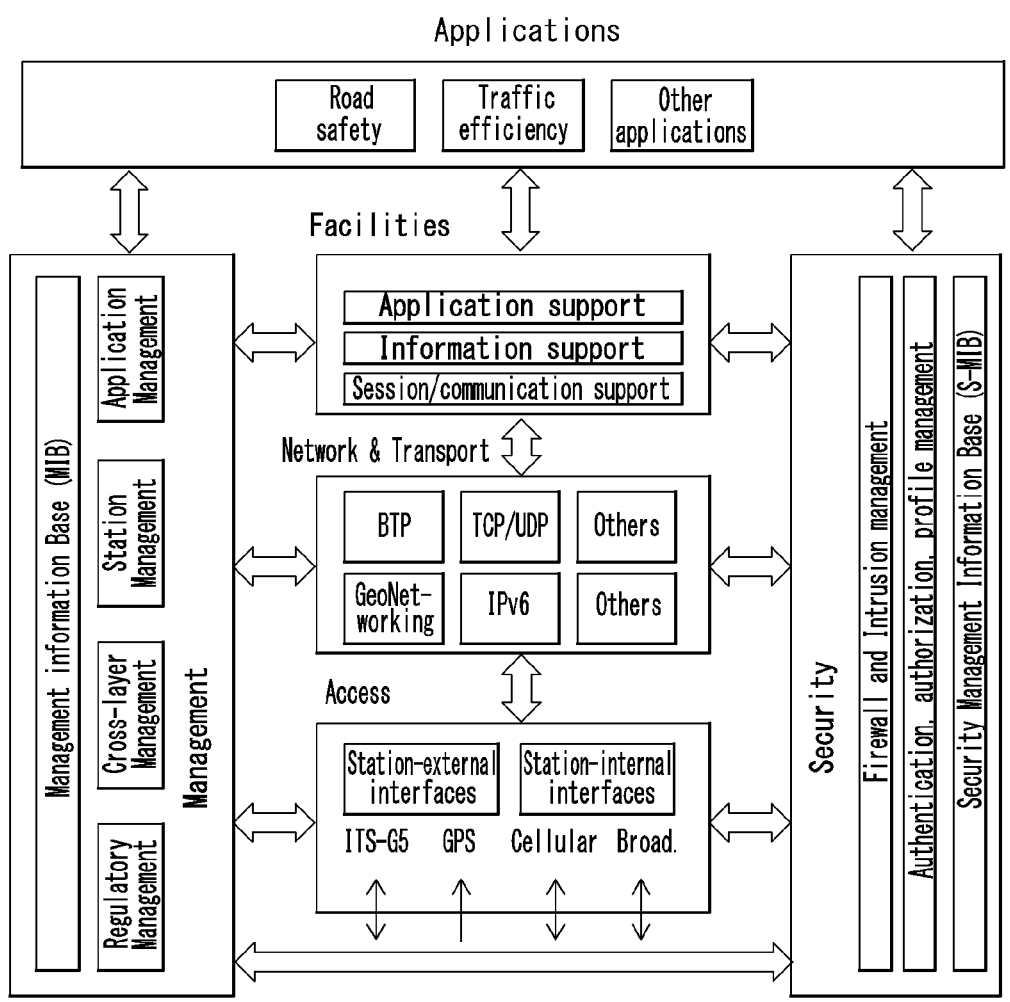

[FIG. 3]
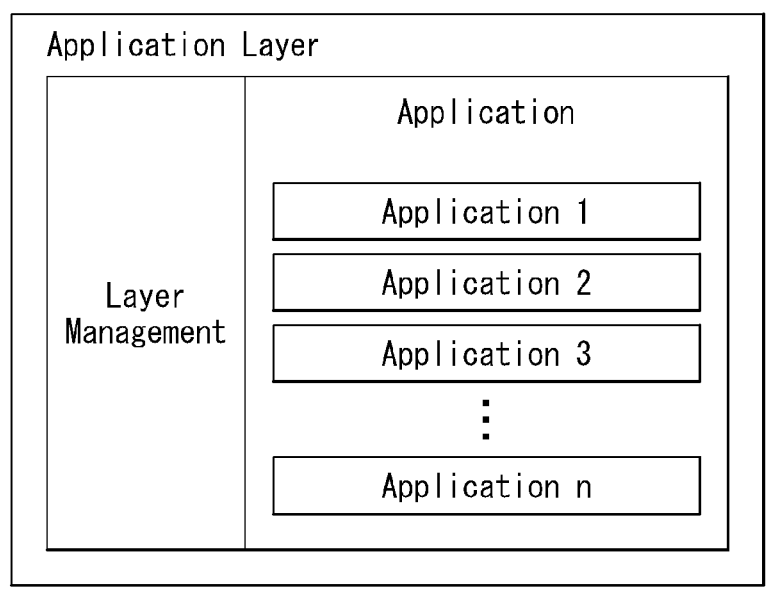

[FIG. 4]
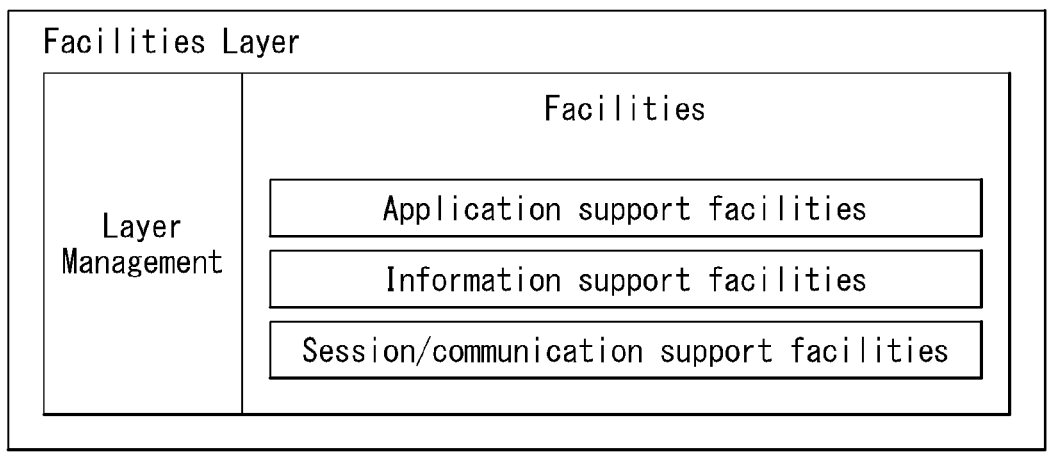

[FIG. 5]
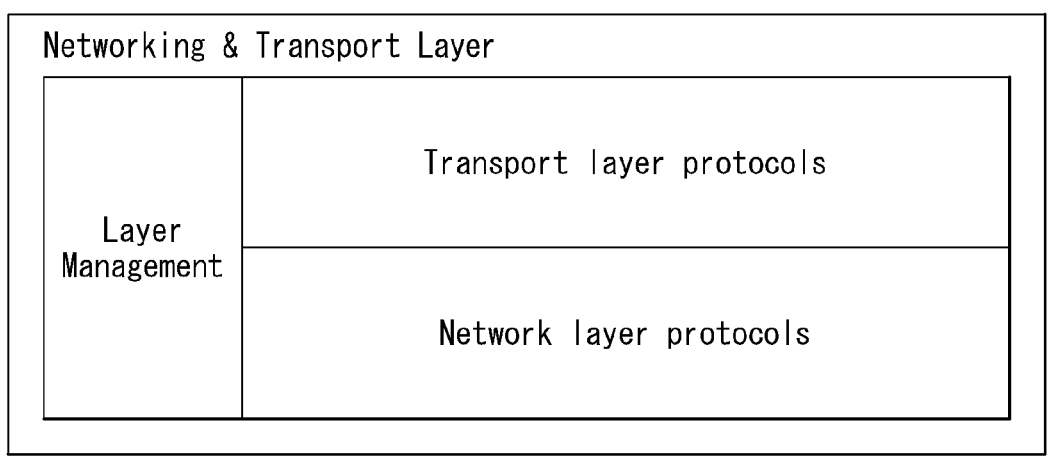

[FIG. 6]
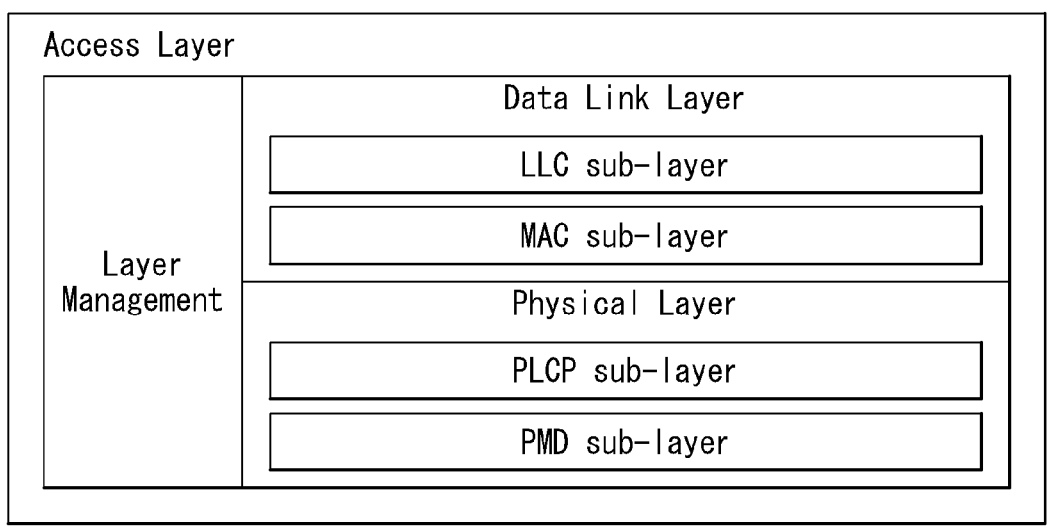

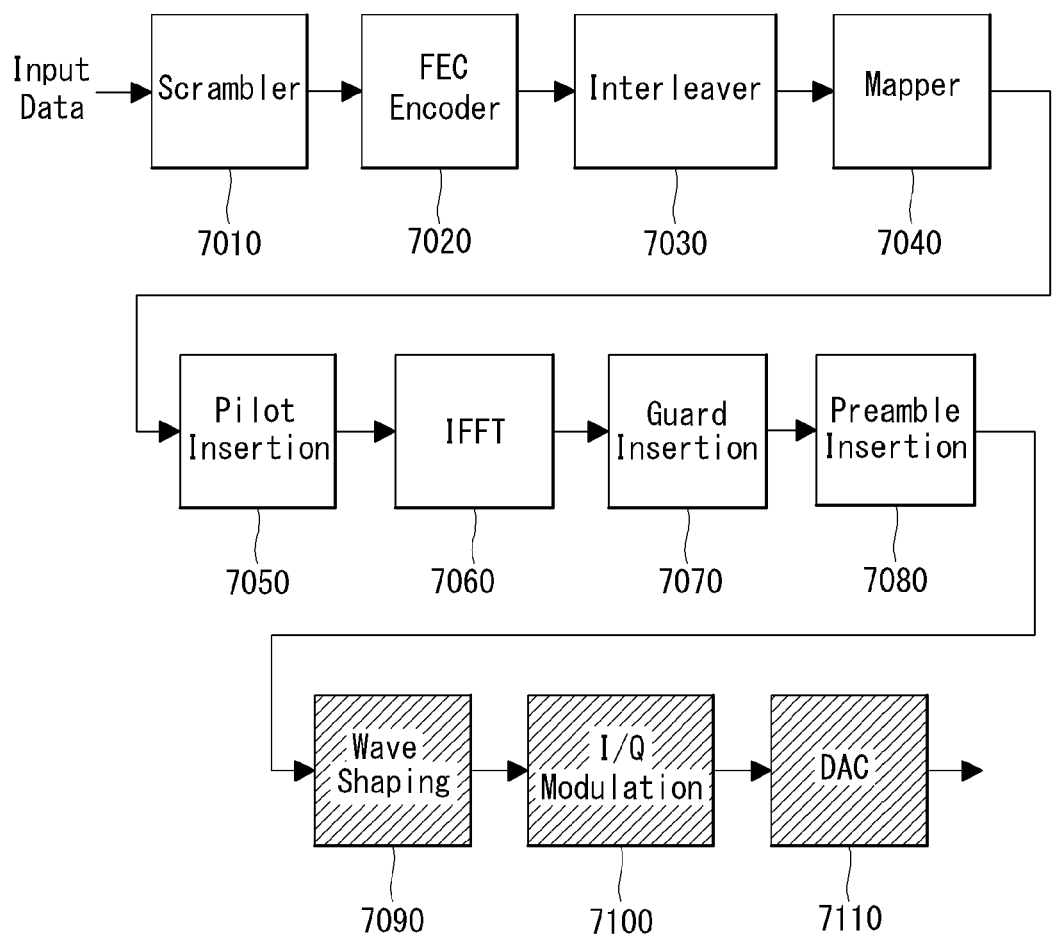
[FIG. 7]

[FIG. 8]
V2X Message Set
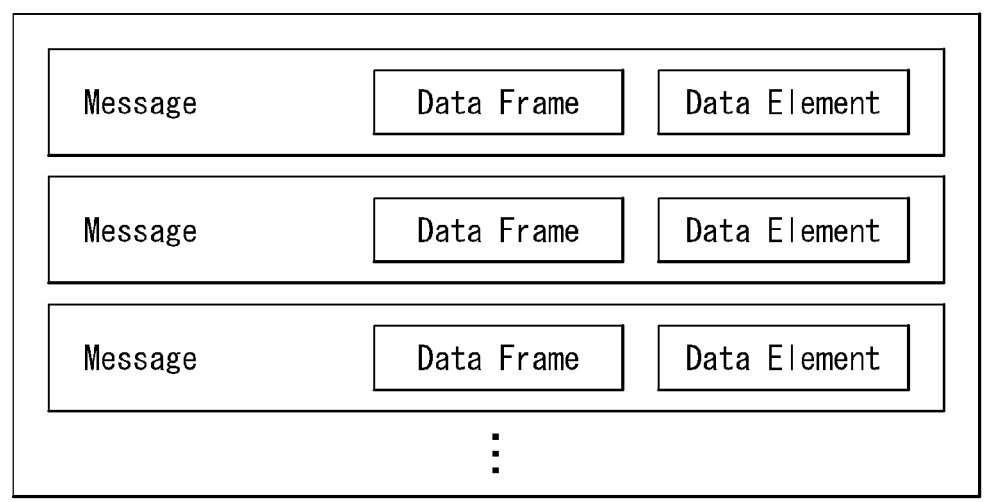

[FIG. 9]

```
ASN.1 Representation:
  BasicSafetyMessage ::= SEQUENCE {
    -- Part I, Sent at all times with each message
    coreData       BSMcoreData, -- Part II, Content
    PartII         SEQUENCE (SIZE(1..8)) OF
                   PartIIcontent {{ BSMpartIIExtension }} OPTIONAL, regional       SEQUENCE (SIZE(1..4)) OF
                   RegionalExtension {{ REGION.Reg-BasicSafetyMessage }}
    ...
  }
```

Data Frame: DF_BSMcoreData

```
ASN.1 Representation:
  BasicSafetyMessage ::= SEQUENCE {
    msgCnt         MsgCount,
    id             TemporaryID,
    secMark        DSecond,
    lat            Latitude,
    long           Longition,
    elev           Elevation,
    accuracy       PositionalAccuracy,
    transmission   transmissionState,
    speed          Speed,
    heading        Heading,
    angle          SteeringWheelAngle,
    accelSet       AccelerationSet4Way,
    brakes         BrakeSystemStatus,
    size           VehicleSize,
  }
```

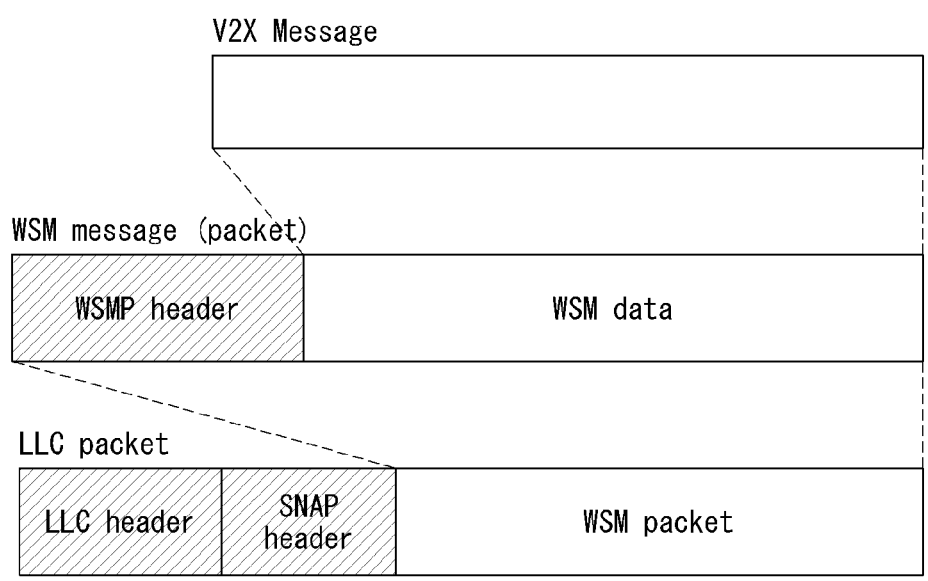

[FIG. 10B]
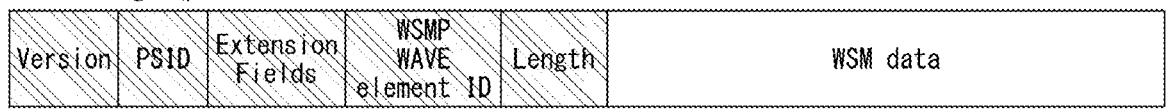

[FIG. 10C]
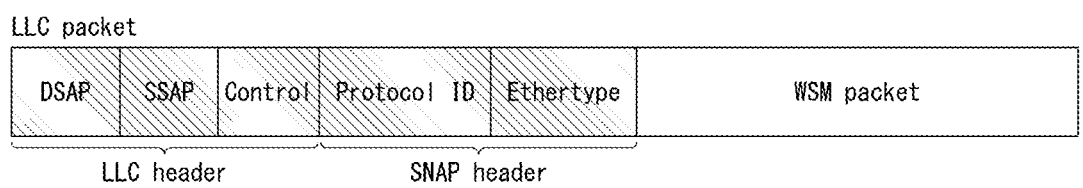

[FIG. 11A]
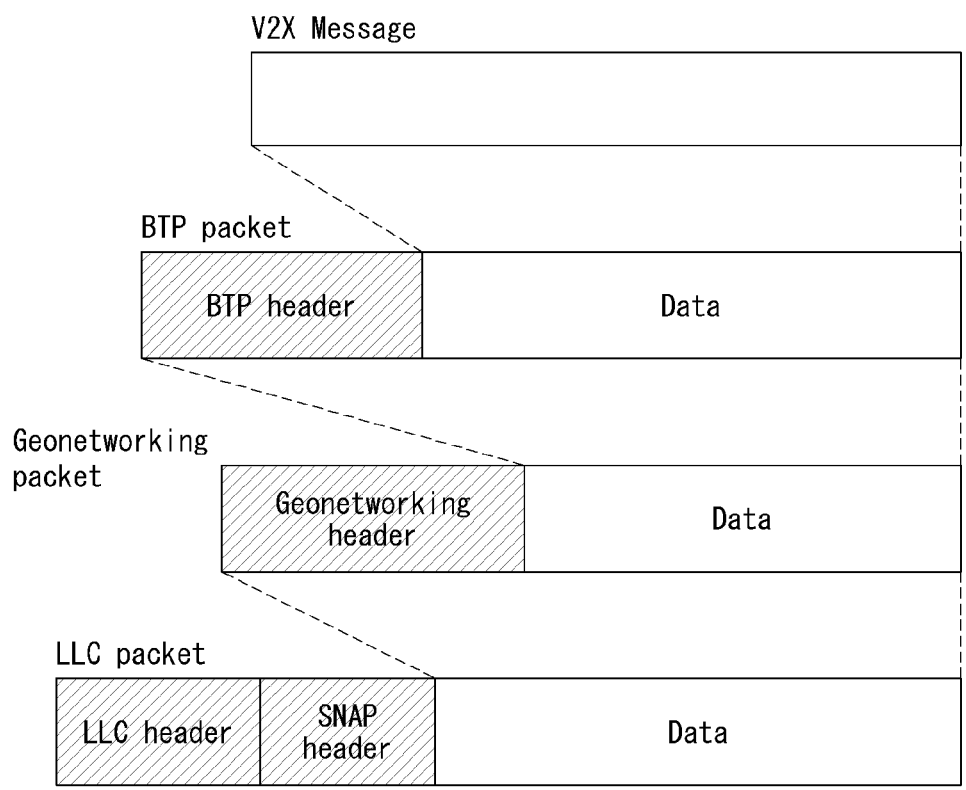

[FIG. 11B]
BTP packet

[FIG. 11C]
Geonetworking packet
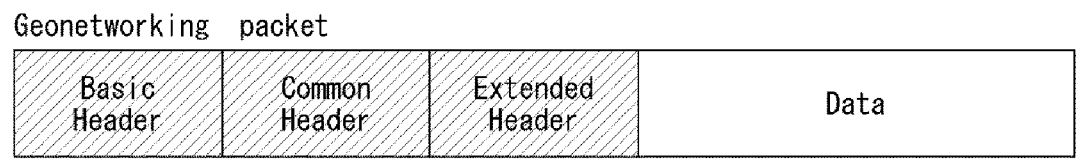

[FIG. 12]
V2I message
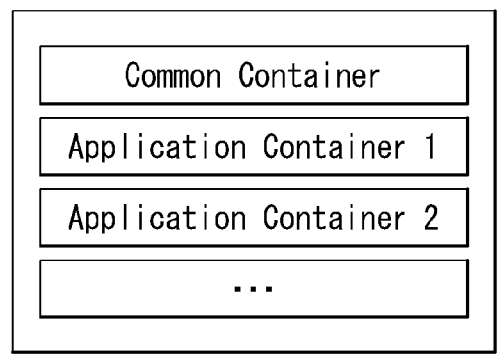
(a)
V2I message
(work zone application)
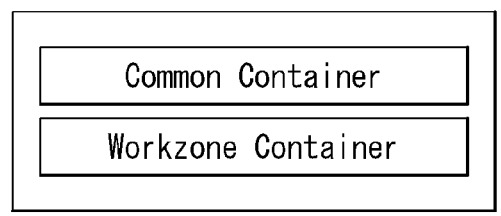
(b)

[FIG. 13]

```
CommonContainer ::= SEQUENCE { msgID          DE_DSRC_MessageID2,                      -- in J2735
stationID      DE_TemporaryID     OPTIONAL             -- in J2735
eventID        eventID,
segmentedID    segmentedID              OPTIONAL,
detTime        DF_DDateTime             OPTIONAL,       -- in J2735
validityDur    validityDur              OPTIONAL,
Event          subcausecode,      --TPEG-TEC as used in DENM
refPos         DF_Position3D,
posAcc         DF_PositionalAccuracy    OPTIONAL,  -- in J2735
heading        DE_Heading               OPTIONAL,  -- in J2735
headingConf    DE_HeadingConfidence     OPTIONAL,  -- in J2735
speedLimits    SEQUENCE(1..10) OF DF_NodeList OPTIONAL,
traffDir       DE_DirectionOfUse        OPTIONAL,  -- in J2735
width          DE_LaneWidth             OPTIONAL,  -- in J2735
approachpath   SEQUENCE(1..10) OF DF_NodeList    OPTIONAL, -- in J2735

```
WorkZoneContainer ::= SEQUENCE {
   laneStatus       SEQUENCE (SIZE(1..10)) OF DE_LaneStatus,
   laneClosOffsets  SEQUENCE (SIZE(1..10)) OF ObstacleDistance,
   geometry         DF_RoadSegmentList,
   length           DE_Length,
   workersPresent   DE_Activity,
}
```

[FIG. 15A]
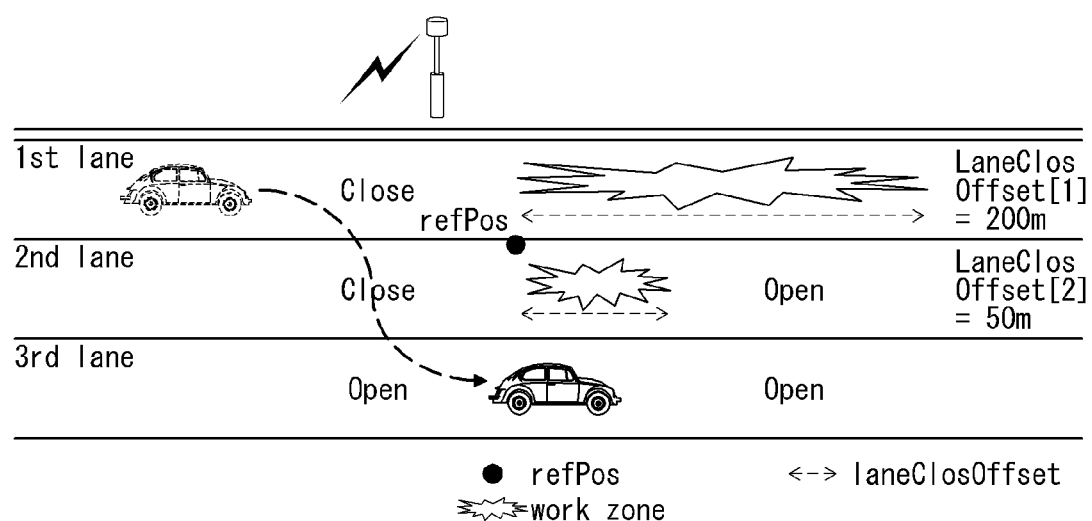

[FIG. 15B]
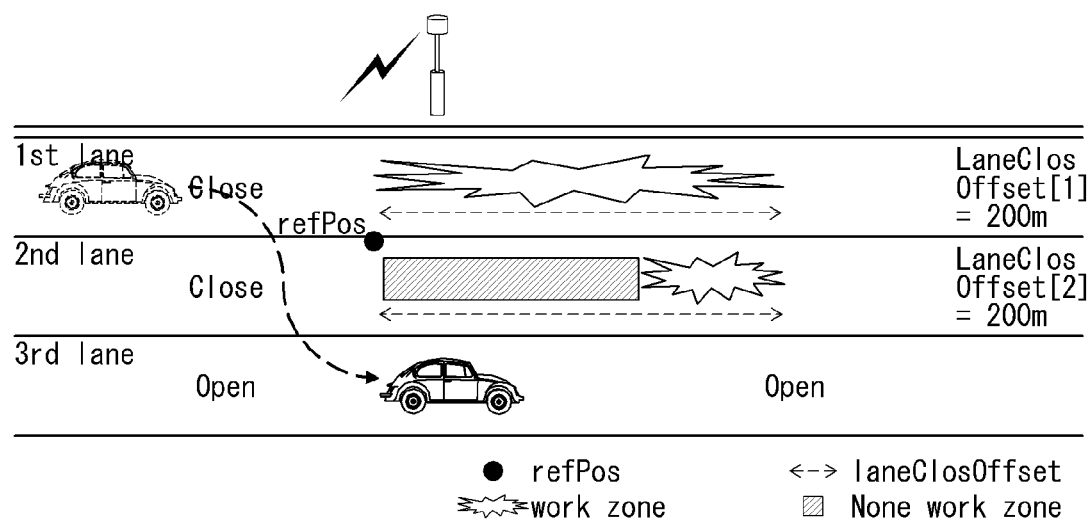

[FIG. 16]

```
WorkZoneContainer ::= SEQUENCE {
    laneStatus              SEQUENCE (SIZE(1..10)) OF DE_LaneStatus,
    laneClosOffsets         SEQUENCE (SIZE(1..10)) OF ObstacleDistance,
    laneClosStartOffsets    SEQUENCE (SIZE(1..10)) OF ObstacleDistance,
    geometry                DF_RoadSegmentList,
    length                          DE_Length,
    workersPresent          DE_Activity,
}
```

[FIG. 17]
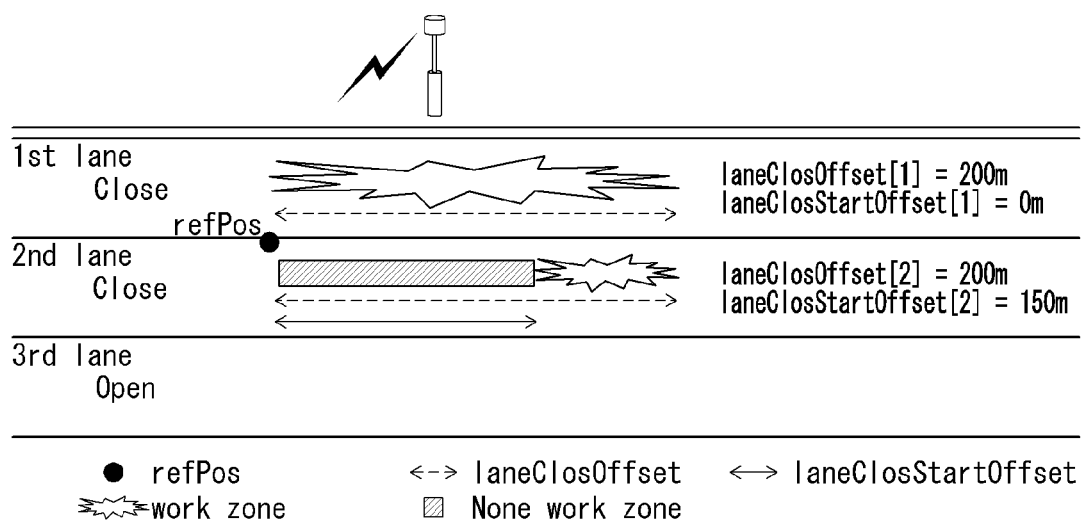

[FIG. 18]

```
WorkZoneContainer ::= SEQUENCE {
  laneStatus              SEQUENCE (SIZE(1..10)) OF DE_LaneStatus,
  refPosOffsets           SEQUENCE (SIZE(1..10)) OF Distance,
  laneClosOffsets         SEQUENCE (SIZE(1..10)) OF ObstacleDistance,
  geometry                DF_RoadSegmentList,
  length                          DE_Length,
  workersPresent          DE_Activity,
}
```

[FIG. 19]
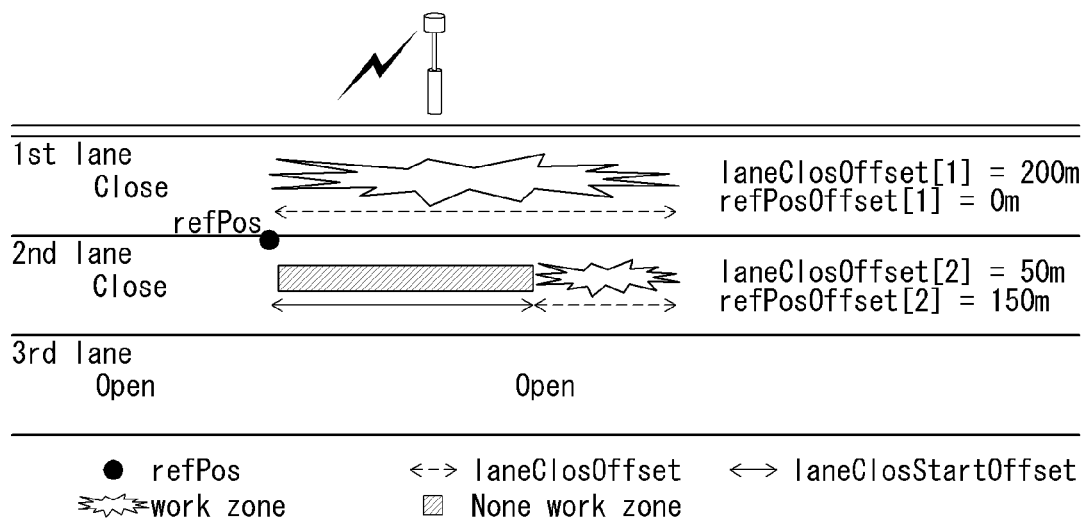

[FIG. 20]

```
CommonContainer ::= SEQUENCE { msgID          DE_DSRC_MessageID2,                    -- in J2735
stationID      DE_TemporaryID      OPTIONAL           -- in J2735
eventID        eventID,
segmentedID    segmentedID         OPTIONAL,
detTime        DF_DDateTime        OPTIONAL,          -- in J2735
validityDur    validityDur         OPTIONAL,
Event          subcausecode,       --TPEG-TEC as used in DENM
refPos         DF_Position3D,
refPos         SEQUENCE (SIZE(1..10)) OF DF_Position3D,
posAcc         DF_PositionalAccuracy   OPTIONAL, -- in J2735
heading        DE_Heading              OPTIONAL, -- in J2735
headingConf    DE_HeadingConfidence    OPTIONAL, -- in J2735
speedLimits    SEQUENCE(1..10) OF DF_NodeList OPTIONAL,
traffDir       DE_DirectionOfUse       OPTIONAL, -- in J2735
width          DE_LaneWidth            OPTIONAL, -- in J2735
approachpath   SEQUENCE(1..10) OF DF_NodeList     OPTIONAL, -- in J2735

}
```

[FIG. 21]
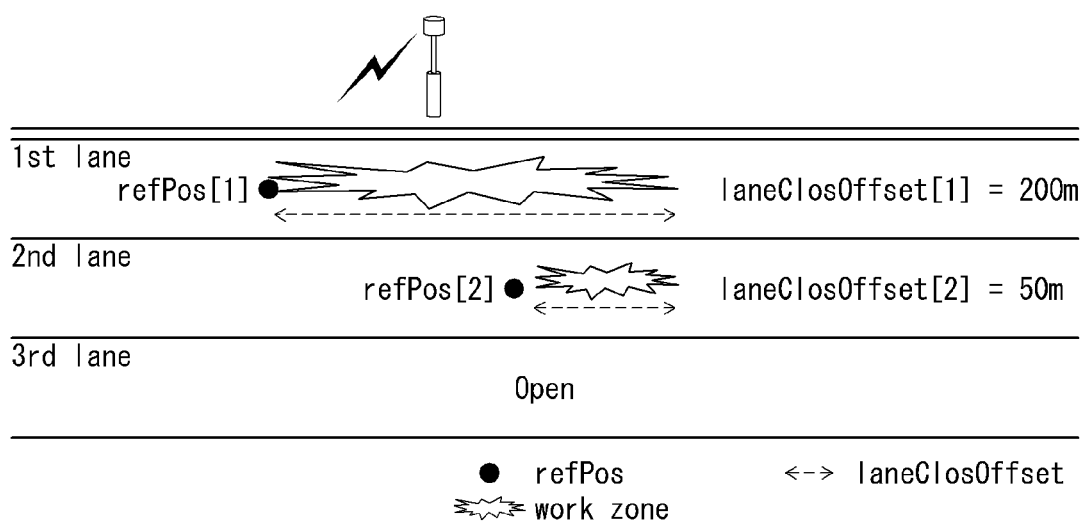

【FIG. 22A】
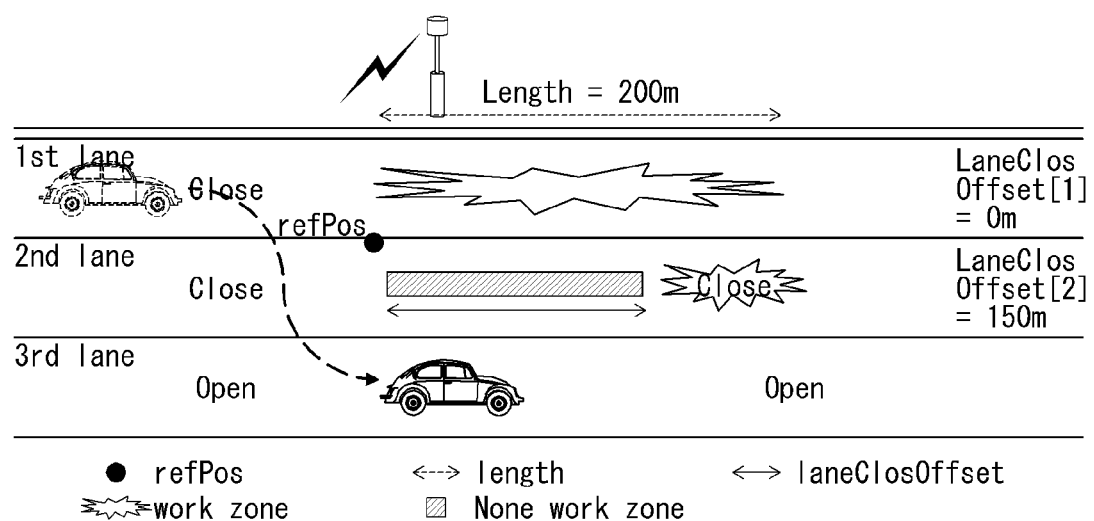

[FIG. 22B]
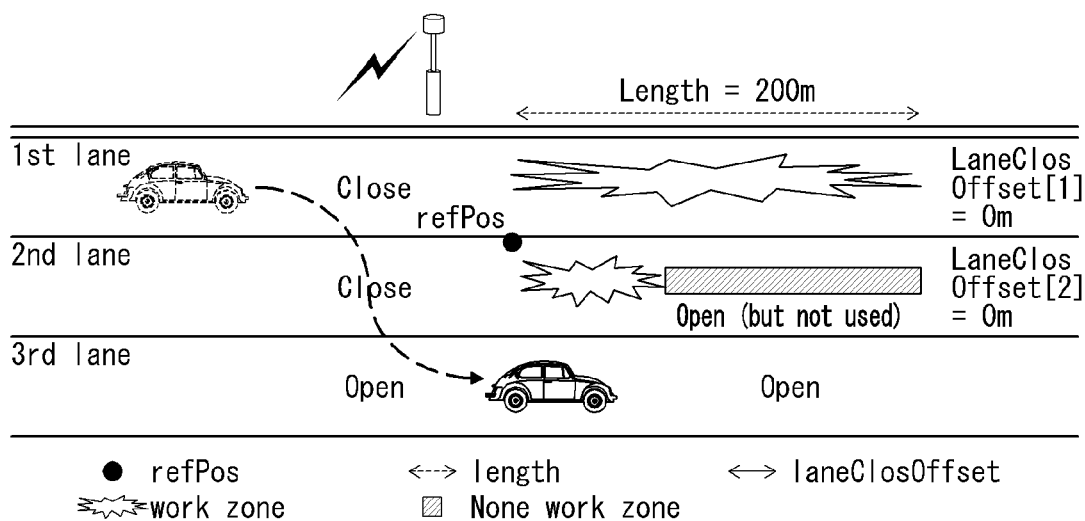

[FIG. 23]

```
WorkZoneContainer ::= SEQUENCE {
    laneStatus              SEQUENCE (SIZE(1..10)) OF DE_LaneStatus,
    laneClosOffsets         SEQUENCE (SIZE(1..10)) OF ObstacleDistance,
    laneClosEndOffsets      SEQUENCE (SIZE(1..10)) OF ObstacleDistance,
    geometry                DF_RoadSegmentList,
    length                          DE_Length,
    workersPresent          DE_Activity,
}
```

[FIG. 24]
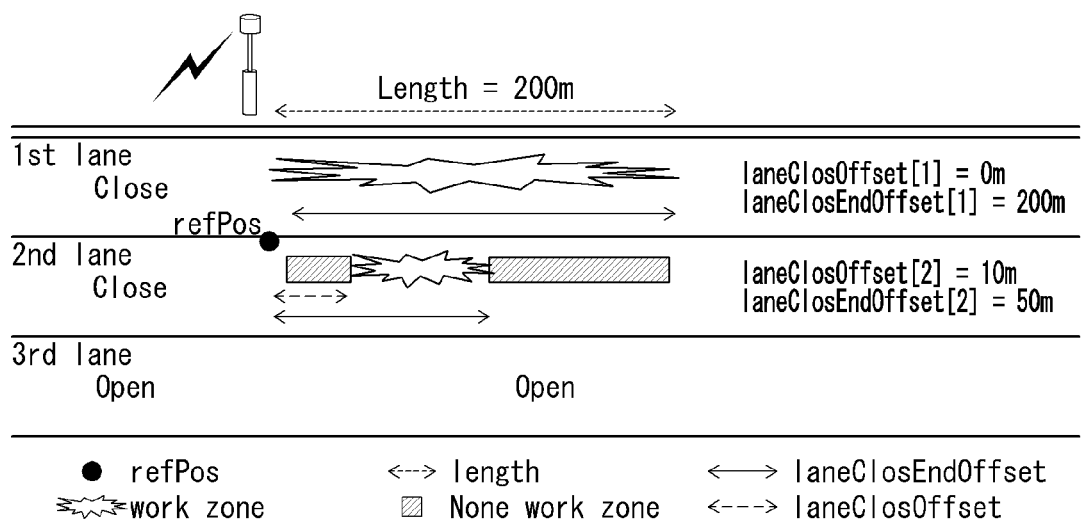

[FIG. 25]

```
WorkZoneContainer ::= SEQUENCE {
  laneStatus              SEQUENCE (SIZE(1..10)) OF DE_LaneStatus,
  laneClosOffsets         SEQUENCE (SIZE(1..10)) OF ObstacleDistance,
  geometry                DF_RoadSegmentList,
  length                  SEQUENCE (SIZE(1..10)) OF DE_Length,
  workersPresent          DE_Activity,
}
```

[FIG. 26]
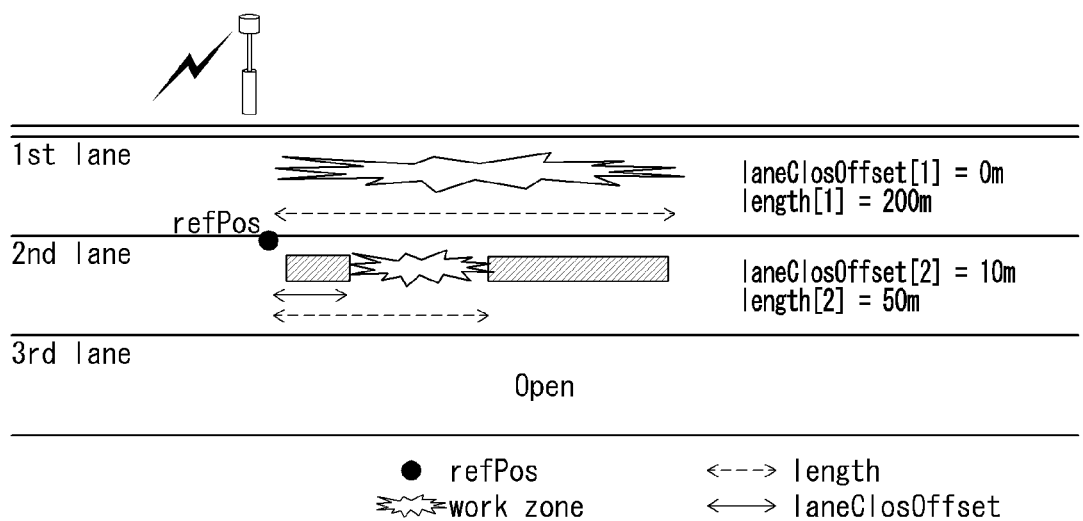

[FIG. 27]
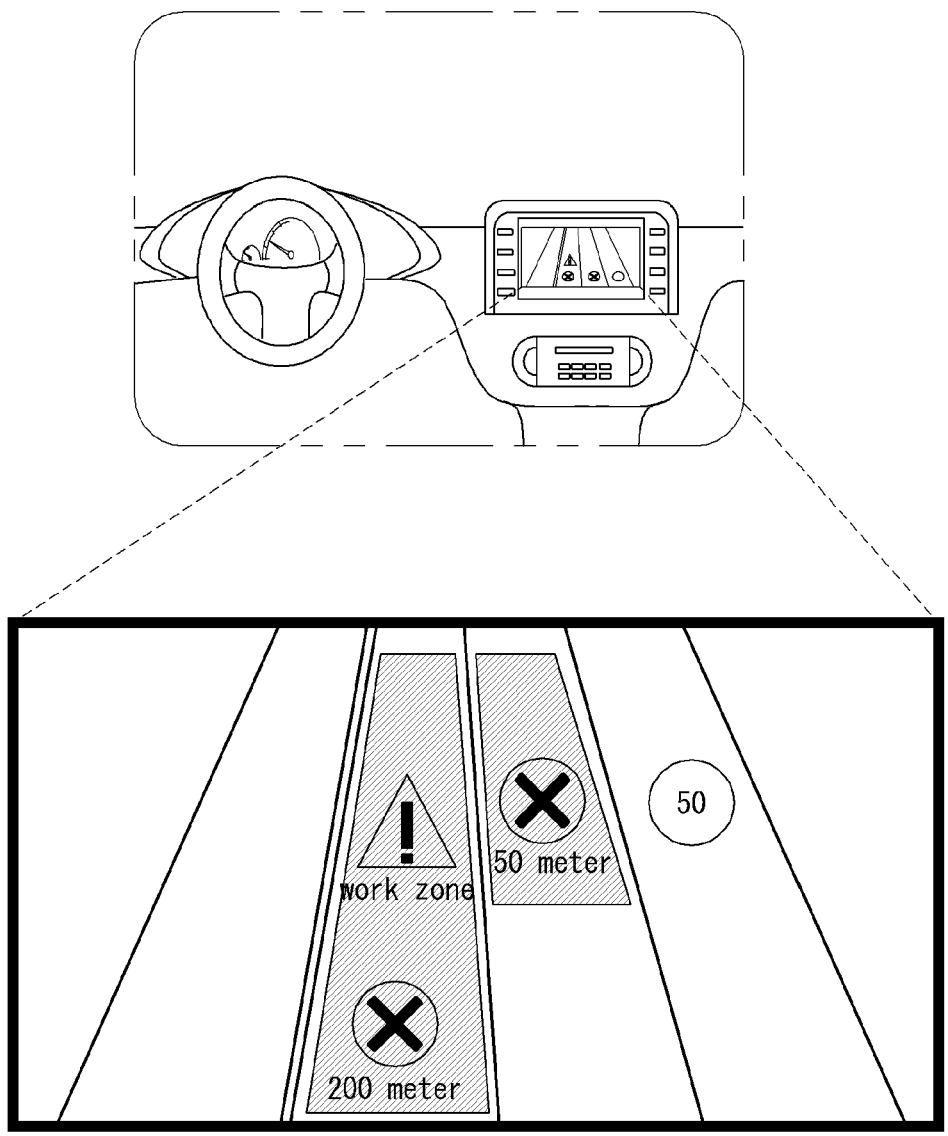

[FIG. 28]
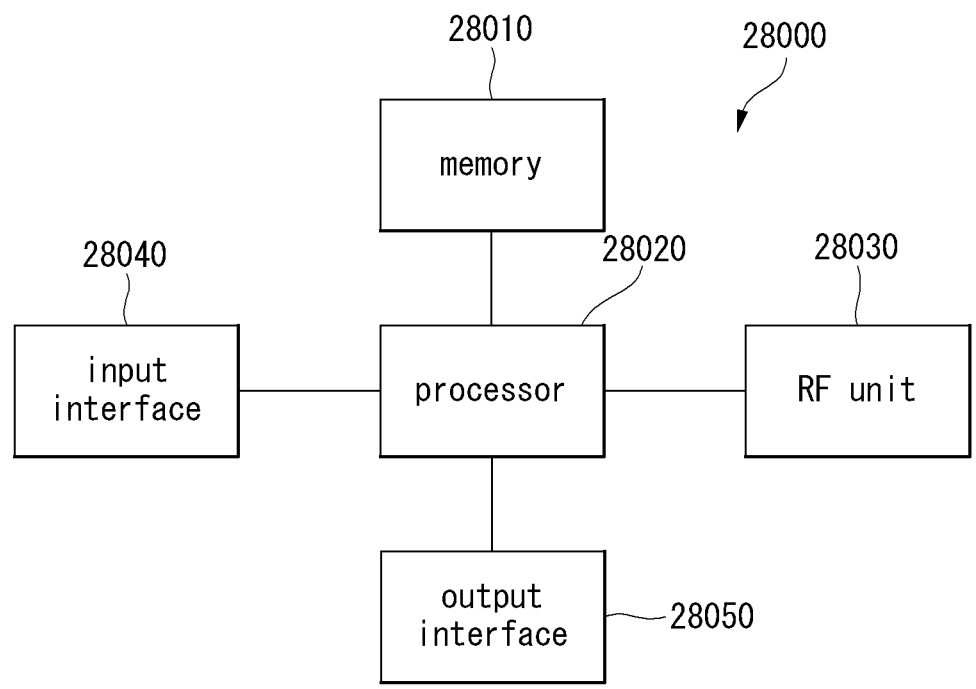

[FIG. 29]
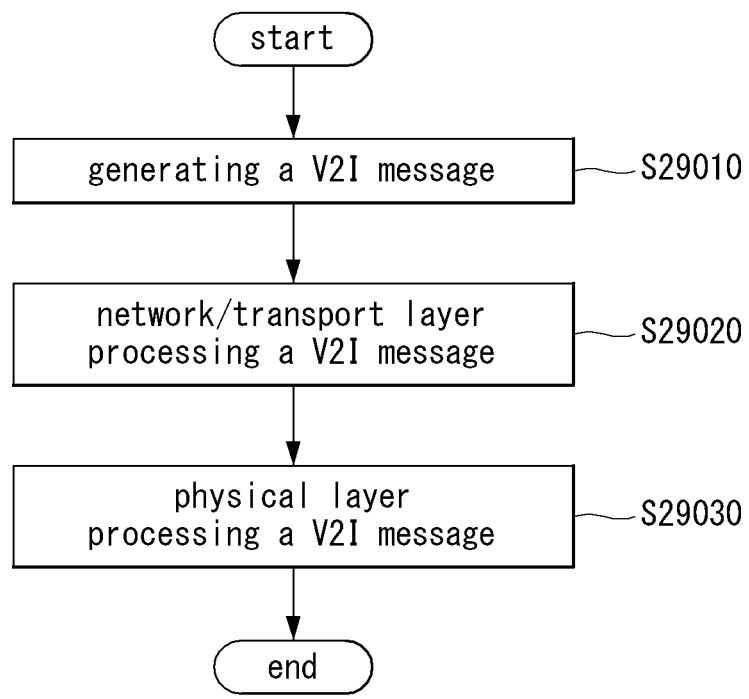

DEVICE AND METHOD FOR V2X COMMUNICATION

CROSS-REFERENCE TO RELATED APPLICATIONS

This application is the National Stage filing under 35 U.S.C. 371 of International Application No. PCT/KR2017/000206, filed on Jan. 6, 2017, the contents of which are all hereby incorporated by reference herein in their entirety.

TECHNICAL FIELD

The present invention relates to a device and method for V2X communication, and particularly, to a method of transmitting and receiving a V2X message for V2X communication.

BACKGROUND ART

Nowadays, vehicles are being changed from a product of mechanical engineering to a product of complex industrial technology in which electrical, electronic, and communication technologies are converged and thus the vehicle is referred to as a smart car. The smart car connects a driver, a vehicle, and a traffic infrastructure to provide various user customized moving services as well as traditional vehicle technology such as a traffic safety/complex solution. Such connectivity may be implemented using Vehicle to Everything (V2X) communications technology.

DISCLOSURE

Technical Problem

Various services may be provided through V2X communication. Various services may be provided between a vehicle and an infrastructure or between a vehicle or a vulnerable road user as well as a vehicle to vehicle service. Accordingly, it is important to configure and transmit and receive a V2X message set or a V2X message for providing accurate security related information in each service environment.

Technical Solution

In order to solve the above technical problem, the present invention provides a device and method for V2X communication.

A method of transmitting a V2I message of a V2X communication device according to an embodiment of the present invention includes generating a V2I message for providing a V2I service, which is a service between a vehicle and an infrastructure, wherein the V2I message includes a first container including information to be commonly used for the V2I service and a second container including information to be used for a specific V2I service; network/transport layer processing the V2I message; and generating a signal frame by a physical layer processing the V2I message, wherein the first container includes message ID information representing an identifier of the V2I message, event ID information representing an identifier of an event, and reference position information representing a first reference position related to the event.

In an embodiment, the network/transport layer processing of the V2I message may include generating a WSM message by processing the V2I message based on a Wave Short Message Protocol (WSMP).

A V2X communication device according to an embodiment of the present invention includes a radio frequency (RF) unit for transmitting and receiving a radio signal; and a processor for controlling the RF unit, wherein the processor is configured to generate a V2I message for providing a V2I service, which is a service between a vehicle and an infrastructure, wherein the V2I message includes a first container including information to be commonly used for the V2I service and a second container including information to be used for a specific V2I service; to network/transport layer process the V2I message; and to generate a signal frame by physical layer processing the V2I message packet, wherein the first container includes message ID information representing an identifier of the V2I message, event ID information representing an identifier of an event, and reference position information representing a first reference position related to the event.

In an embodiment, the network/transport layer processing of the V2I message may include generating a WSM message by processing the V2I message based on a Wave Short Message Protocol (WSMP).

In an embodiment, when the specific V2I service is a work zone safety related service, the second container may include lane closed segment information representing a distance from a second reference position to an end point of the closed lane.

In an embodiment, the second container may further include lane closed start segment information representing a distance from the first reference position to a start point of the closed lane.

In an embodiment, the second container may further include reference position offset information representing an offset distance from the first reference position to an actual position.

In an embodiment, the second reference position may be the same as the first reference position or may be the sum of the first reference position and the offset distance.

In an embodiment, the reference position information may be a sequence of the first reference position related to the event.

Advantageous Effects

According to the present invention, when transmitting a V2I message for providing a work zone safe related service, by using lane closed segment information and information on a start point of a lane closed segment, more accurate work segment related information can be provided. Further, according to the present invention, by using single reference position information and offset information on a reference position, more accurate work segment related information can be provided. Further, according to the present invention, by using a sequence of reference position information, more accurate work segment related information can be provided. Thereby, accurate work zone safety related information can be provided to a user.

DESCRIPTION OF DRAWINGS

The accompanying drawings, which are included to provide a further understanding of the invention and are incorporated in and constitute a part of this application, illustrate embodiments of the invention and, together with the description, serve to explain the principles of the invention.

FIG. 1 illustrates an exemplary architecture of a V2X communication device according to an embodiment of the present invention.

FIG. 2 illustrates an exemplary architecture of a V2X communication device according to another embodiment of the present invention.

FIG. 3 illustrates an application layer of a V2X communication device according to an embodiment of the present invention.

FIG. 4 illustrates a facilities layer of a V2X communication device according to an embodiment of the present invention.

FIG. 5 illustrates a network/transport layer of a V2X communication device according to an embodiment of the present invention.

FIG. 6 illustrates an access layer of a V2X communication device according to an embodiment of the present invention.

FIG. 7 illustrates a physical layer configuration of a V2X communication device according to an embodiment of the present invention.

FIG. 8 illustrates a V2X communication message set according to an embodiment of the present invention.

FIG. 9 illustrates an example of a message in the V2X communication message set of FIG. 8.

FIG. 10(a) illustrates a method in which a V2X communication device processes a V2X message according to an embodiment of the present invention. FIG. 10(b) illustrates an exemplary structure of a WSM message processed by the processing method of FIG. 10(a), and FIG. 10(c) illustrates an exemplary structure of an LLC packet processed by the processing method of FIG. 10(a).

FIG. 11(a) illustrates a method in which a V2X communication device processes a V2X message according to another embodiment of the present invention. FIG. 11(b) illustrates an exemplary structure of a BTP packet processed by the processing method of FIG. 11(a), and FIG. 11(c) illustrates an exemplary structure of a geonetworking packet processed by the processing method of FIG. 11(a).

FIG. 12 illustrates a structure of a V2I message according to an embodiment of the present invention.

FIG. 13 illustrates a common container of a V2I message according to an embodiment of the present invention.

FIG. 14 illustrates an application container in a V2I message according to an embodiment of the present invention.

FIG. 15 illustrates a method in which a V2X communication device provides work segment related information based on a V2I message according to an embodiment of the present invention.

FIG. 16 illustrates an application container in a V2I message according to another embodiment of the present invention.

FIG. 17 illustrates a method in which a V2X communication device provides work segment related information based on a V2I message according to an embodiment of the present invention.

FIG. 18 illustrates an application container in a V2I message according to another embodiment of the present invention.

FIG. 19 illustrates a method in which a V2X communication device provides work segment related information based on a V2I message according to an embodiment of the present invention.

FIG. 20 illustrates a common container in a V2I message according to another embodiment of the present invention.

FIG. 21 illustrates a method in which a V2X communication device provides work segment related information based on a V2I message according to an embodiment of the present invention.

FIG. 22 illustrates a method in which a V2X communication device provides work segment related information based on a V2I message according to another embodiment of the present invention.

FIG. 23 illustrates an application container in a V2I message according to another embodiment of the present invention.

FIG. 24 illustrates a method in which a V2X communication device provides work segment related information based on a V2I message according to an embodiment of the present invention.

FIG. 25 illustrates an application container in a V2I message according to an embodiment of the present invention.

FIG. 26 illustrates a method in which a V2X communication device provides work segment related information based on a V2I message according to an embodiment of the present invention.

FIG. 27 illustrates a screen in which a V2X communication device provides a safety alarm using a V2I message according to an embodiment of the present invention.

FIG. 28 illustrates a block diagram of a V2X communication device according to an embodiment of the present invention.

FIG. 29 is a flowchart illustrating a method in which a V2X communication device transmits a V2I message according to an embodiment of the present invention.

BEST MODE FOR CARRYING OUT THE INVENTION

Preferred embodiments of the present invention will be described in detail with reference to the accompanying drawings. The following detailed description with reference to the attached drawings is for the purpose of illustrating preferred embodiments of the present invention rather than illustrating only embodiments that may be implemented according to embodiments of the present invention. The following detailed description includes details in order to provide a thorough understanding of the present invention, but the present invention does not require all of these details. The present invention is not limited to separately use each of embodiments described hereinafter. Multiple embodiments or all of embodiments may be used together, and specific embodiments may be used as a combination.

Most of terms used in the present invention are selected from common ones widely used in the field, but some terms are arbitrarily selected by the applicant and a meaning thereof will be described in detail in the following description, as needed. Accordingly, the present invention should be understood based on an intended meaning of the term rather than a mere name or meaning of the term.

The present invention relates to a V2X communication device, and the V2X communication device may perform communication between a vehicle and a vehicle, a vehicle and an infrastructure, and a vehicle and a bicycle or a mobile device. The V2X communication device may be abbreviated to a V2X device. In an embodiment, the V2X communication device may be correspond to an on board unit (OBU) of a vehicle or may be included in the OBU. The V2X device may be correspond to a Road Side Unit (RSU) of an infrastructure or may be included in the RSU. Alternatively, the V2X communication device may be included in an Intelligent Transport System (ITS) station (or device) to perform all or some functions of the ITS station. Alternatively, the V2X communication device may perform all or some functions of a Wireless Access In Vehicular Environments (WAVE) station implemented using the WAVE station (or device).

FIG. 1 illustrates an exemplary architecture of a V2X communication device according to an embodiment of the present invention. FIG. 1 may be, for example, an exemplary architecture of a V2X communication device that may be implemented based on a reference architecture of an Intelligent Transport System (ITS) station (or device) according to the United States (US) standard. In an embodiment, the V2X communication device may be included in the ITS station to perform all or some functions of the ITS station. In an embodiment, an ITS station according to the US Standard may be implemented based on a WAVE station according to the IEEE802.11 and IEEE1609 standard.

In architecture of FIG. 1, a communication network between two end vehicles/users/infrastructures may be formed, and such communication may be performed through a function of each layer of the architecture of FIG. 1. For example, when a message is communicated between the infrastructure and the vehicle, in a transmission infrastructure (or vehicle) and a V2X communication device thereof, by passing through each layer downward by one layer, data may be transferred, and in a receiving vehicle (or infrastructure) and a V2X communication device thereof, by passing through each layer upward by one layer, data may be transferred. A description of each layer of an architecture of FIG. 1 is as follows.

Application layer: the application layer may implement and support various use cases or applications. For example, the application layer may provide various applications such as a Vehicle to Vehicle (V2V) application, a Vehicle to Infrastructure (V2I) application, and a Vehicle to others (V2O) application.

Facilities layers: the facilities layer may support to effectively realize various use cases defined in an application layer. In an embodiment, the facilities layer may perform a function of generating a message (or message set) based on information to be transmitted at an application layer, which is an upper layer.

Networking & Transport layer: The networking & transport layer may constitute a network for vehicle communication between homogenous/heterogenous networks by using various transport protocols and network protocols. For example, the networking & transport layer may provide Internet access and routing using an Internet protocol such as TCP/UDP+IPv6. Alternatively, the networking & transport layer may constitute a vehicle network using a Wave Short Message Protocol (WSMP).

Access layer: the access layer may transmit a message/data received from the upper layer through a physical channel. For example, the access layer may perform/support data communication based on IEEE 802.11 and/or 802.11p standard based communication technology, IEEE 1609 and/or IEEE 1609.4 standard based communication technology. The access layer has a characteristic similar or identical to an OSI 1 layer (physical layer) and an OSI 2 layer (data link layer).

An exemplary architecture of the V2X communication device may further include a management layer and a security layer.

FIG. 2 illustrates an exemplary architecture of a V2X communication device according to another embodiment of the present invention. FIG. 2 may be, for example, an exemplary architecture of a V2X communication device that may be implemented based on a reference architecture of an Intelligent Transport System (ITS) station (or device) according to the EU standard. In an embodiment, the V2X communication device may be included in the ITS station to perform all or some functions of the ITS station. Each layer of the architecture of FIG. 2 may have the same characteristics as or characteristics similar to each layer of a corresponding architecture of FIG. 1.

In the architecture of FIG. 2, as in the architecture of FIG. 1, communication between two end vehicles/users/communication infrastructures may be performed through functions of each layer of the architecture of FIG. 2. For example, when a message between vehicles is communicated, in a transmitting vehicle and a V2X communication device thereof, by passing through each layer downward by one layer, data may be transferred, and in a receiving vehicle and a V2X communication device thereof, by passing through each layer upward by one layer, data may be transferred. A description of each layer of the architecture of FIG. 2 is as follows.

Application layer: the application layer of FIG. 2 may have the same characteristics as or characteristics similar to those of the application layer of FIG. 1. For example, the application layer may implement and support various use cases as in provision of road safety, efficient traffic information, and other application information.

Facilities layers: the facilities layer of FIG. 2 may have the same characteristics as or characteristics similar to those of the facilities layer of FIG. 1. For example, the facilities layer may perform application support, information support, and session/communication support to support to effectively realize various use cases defined at the application layer.

Networking & Transport layer: the networking & transport layer of FIG. 2 may have the same characteristics or characteristics similar to those of the networking & transport layer of FIG. 1. For example, the networking & transport layer may provide Internet access and routing using an Internet protocol such as TCP/UDP+IPv6 to constitute a network for vehicle communication. Alternatively, the networking & transport layer may constitute a vehicle network using a geographical position based protocol such as Basic Transport Protocol (BTP)/Geonetworking.

Access layer: the access layer of FIG. 2 may have the same characteristics as or characteristics similar to those of the access layer of FIG. 1. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

An exemplary architecture of the V2X communication device of FIG. 2 may further include a management layer and a security layer, as in the exemplary architecture of the V2X communication device of FIG. 1.

FIG. 3 illustrates an application layer of a V2X communication device according to an embodiment of the present invention. FIG. 3 illustrates in detail an application layer of the V2X communication device of FIG. 1 or an application layer of the V2X communication device of FIG. 2.

The application layer classifies and defines an application and provides a service to an end vehicle/user/infrastructure through a facilities layer, a networking & transport layer, and an access layer, which are lower layers. In this case, the application may be classified and defined for each use case.

For example, the application may be classified and defined into a V2V application, a V2I application, a V2O application, and an I2O application. The V2V application is an application that provides a V2V service such as a vehicle security service and a driving support service using V2V technology, which is communication technology between vehicles. The V2I application is an application that provides a V2I service such as a vehicle safety service and a traffic information service using V2I technology, which is communication technology between a vehicle and an infrastructure. Here, the infrastructure may be a safety facility at a periphery of a road such as traffic light and street light. The V2O application is an application that provides a V2O service such as a vehicle safety service and a vulnerable road user protection service using V2O technology, which is communication technology between a vehicle and others. Here, other mean things, except for the vehicle and the infrastructure and may be, for example, a vulnerable road user such as a pedestrian. The I2O application is an application that provides an I2O service such as a vehicle safety service and a vulnerable road user protection service using I2O technology, which is communication technology between an infrastructure and others.

In another example, the application may be classified and defined into other applications such as a road-safety application, a traffic efficiency application, a local services application, and infotainment.

The aforementioned classification of the application is only an illustration, and the scope of the present invention is not limited to such classification. Further, such application classification and use case may be newly updated when a new application scenario occurs.

Layer Management performs a function of managing and servicing information related to an operation and security of an application layer, information and services are transferred and shared in two-way through an interface between management entity and application layer (MA) and an interface between security entity and applications (SA) (or SAP: Service Access Point, e.g., MA-SAP, SA-SAP). A request from the application layer to the facilities layer or information transfer from the facilities layer to the application layer is performed through an interface between facilities layer and ITS-S applications (FA) (or FA-SAP).

FIG. 4 illustrates a facilities layer of a V2X communication device according to an embodiment of the present invention. FIG. 4 illustrates in more detail a facilities layer of the V2X communication device of FIG. 1 or a facilities layer of the V2X communication device of FIG. 2. The facilities layer of FIG. 4 has the same characteristics as and characteristics similar to those of an OSI 5 layer (session layer), an OSI 6 layer (presentation layer), and an OSI 7 layer (application layer). That is, the facilities layer basically supports the same function as or a function similar to that of three upper layers of an OSI model.

Further, the facilities layer additionally provides a facility for only the V2X communication device. For example, the facilities layer may provide a facility such as application support, information support, and session/communication support. Here, the facility means a component that provides functionality, information, and data.

A description of three exemplary suggested facilities is as follows.

An application support facility means a facility that supports a basic application set (or message set). In the V2X communication device of FIG. 1, the facilities layer may support, for example, a message such as a Wave short message (WSM). In the case of the V2X communication device FIG. 2, the facilities layer may support, for example, a periodic message such as Co-operative Awareness Messages (CAM) or an event message such as Decentralized Environmental Notification Messages (DENM).

The information support facility is a facility that provides common data information or database to be used for a basic application set (or message set) and may be, for example, a local dynamic map (LDM).

The session/communication support facility is a facility that provides a service for communication and session management and may be an addressing mode and session support.

Layer Management performs a function of managing and servicing information related to an operation and security of the facilities layer. Information and services are transferred and shared in two-way through an interface between management entity and facilities layer (MF) and an interface between security entity and facilities layer (SF) (or MF-SAP, SF-SAP). A request from the application layer to the facilities layer or information transfer from the facilities layer to the application layer is performed through FA (or FA-SAP), and two-way information and service transfer between the facilities layer and the networking & transport layer, which is a lower layer is performed by an interface between networking & transport layer and facilities layer (NF) (or NF-SAP).

As described above, the facilities layer performs support of an application set (or message) as one of major functions. That is, the facilities layer performs a function of generating a message set (or message) based on information to be transmitted or a service to be provided by the application layer. The generated message may be referred to as a V2X message and will be described in detail below with reference to FIG. 8.

FIG. 5 illustrates a networking & transport layer of a V2X communication device according to an embodiment of the present invention. FIG. 5 illustrates in more detail a networking & transport layer of the V2X communication device of FIG. 1 and a networking & transport layer of the V2X communication device of FIG. 2. The networking & transport layer of FIG. 5 has the same characteristics as or characteristics similar to those of an OSI 3 layer (network layer) and an OSI 4 layer (transport layer).

The transport layer is a connection layer between services provided by an upper layer and a lower layer and performs a function of managing data transmitted by a user to accurately arrive at a destination. That is, the transport layer mainly performs a function of dividing data into a packet of an appropriate size to transmit for efficient data transmission at the transmission side and a function of recombining each packet of the received packets to an original file at the receiving side.

In the case of the V2X communication device of FIG. 1, for example, a TCP and a UDP used in an existing Internet network may be used as a transport protocol. In the case of the V2X communication device FIG. 2, for example, a BTP protocol for an ITS station or a TCP and a UDP used in an existing Internet network may be used as a transport protocol.

The network layer is responsible for a logical address, determines a transfer path of a packet, and performs a function of receiving a packet generated in the transport layer to add a logical address of a destination to a header of the network layer. As an example of packet route setting, unicast and broadcast between vehicles, between a vehicle and a fixed station, or between fixed stations may be considered.

In the case of the V2X communication device of FIG. 1, for example, an IP protocol (e.g., IPv6) used in the existing Internet network may be used as a network protocol. In the case of the V2X communication device of FIG. 2, for example, GeoNetworking for an ITS station, and an IP protocol (IPv6 networking with mobility support, IPv6 over GeoNetworking) used in the existing Internet network may be used as a network protocol.

In the above embodiment, the networking & transport layer provides a function of each of a network layer and a transport layer using a separate network protocol and transport layer, but the networking & transport layer may provide a function of a network layer and a transport layer using a single protocol. For example, in the case of the V2X communication device of FIG. 1, the networking & transport layer may provide a function of a networking & transport layer using a Wave Short Message Protocol (WSMP) protocol for a WAVE station. Here, the WSMP protocol is a networking & transport protocol for transmitting a WAVE Short Message (WSM) generated in a facilities layer of a WAVE system to a lower layer.

Layer management performs a function of managing and servicing information related to an operation and security of the networking & transport layer. Information and services are transferred and shared in two-way through an interface between management entity and networking & transport layer (MN) (or MN-SAP) and an interface between security entity and networking & transport layer (SN) (or SN-SAP). Two-way information and service transfer between the facilities layer and the networking & transport layer is performed by an NF (or NF-SAP), and information exchange between the networking & transport layer and the access layer is performed by an interface between access layer and networking & transport layer (IN) (or IN-SAP).

FIG. 6 illustrates an access layer of a V2X communication device according to an embodiment of the present invention.

FIG. 6 illustrates in more detail an access layer of the V2X communication device of FIG. 1 or an access layer of the V2X communication device of FIG. 2. The access layer of FIG. 3 may include a data link layer, a physical layer, and layer management. The access layer of FIG. 3 has the same characteristics as or characteristics similar to those of an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

The data link layer may convert a physical line between adjacent nodes (or between vehicles) having noise into a communication channel having no transmission error so that an upper network layer may use the physical line. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, in order to avoid from erroneously confusing packets or ACK signals, the data link layer performs a function of giving a sequence number to the packet and the ACK signal and a function of controlling setup, maintenance, and short-circuit of a data link between network entities and data transmission. Furthermore, such data link layer may include a logical link control (LLC) sub-layer and a medium access control (MAC) sub-layer based on the IEEE 802 standard.

A main function of the LLC sub-layer is to allow communication unrelated to topology of a network by enabling to use several different lower MAC sub-layer protocols.

The MAC sub-layer may control collision/contention occurrence between vehicles when several vehicles (or nodes or vehicles and peripheral devices) use a shared medium. The MAC sub-layer may format packets transferred from an upper layer to correspond to a frame format of a physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying (busy or idle) whether a wireless medium is being used through carrier sense and clear channel assessment (CCA) to a MAC sub-layer. Furthermore, such a physical layer may include a physical layer convergence protocol (PLCP) sub-layer and a physical medium access (PMD) sub-layer based on the IEEE standards.

The PLCP sub-layer performs a function of connecting an MAC sub-layer and a data frame. The PLCP sub-layer adds a header to reception data to enable the MAC sub-layer to operate regardless of a physical characteristic. Therefore, the PLCP frame may define differently a format thereof according to several different wireless LAN physical layer standards.

A main function of the PMD sub-layer may perform carrier modulation or RF modulation of a frame received from the PLCP sub-layer and then transmit the frame to the wireless medium according to transmission and reception related standards.

Layer management performs a function of managing and servicing information related to an operation and security of an access layer. Information and services are transferred and shared in two-way through an interface between management entity and access layer (MI) (or MI-SAP) and an interface between security entity and access layer (SI) (or SI-SAP). Two-way information and service transfer between the access layer and the networking & transport layer is performed by an IN (or IN-SAP).

FIG. 7 illustrates a physical layer configuration of a V2X communication device according to an embodiment of the present invention.

In an embodiment, FIG. 7 is a block diagram illustrating physical layer signal processing of the IEEE 802.11 or ITS-G5. However, FIG. 7 illustrates a physical layer configuration according to an embodiment of the present invention, and the physical layer configuration is not limited only to the above-described transmission standard technology.

A physical layer processor of FIG. 7 may include a Physical Layer Convergence Protocol (PLCP) sub-layer baseband signal processing part including at least one of a scrambler 7010, an FEC encoder 7020, an interleaver 7030, a mapper 7040, a pilot insertion 7050, an IFFT 7060, a guard insertion 7070, and a preamble insertion 7080 and a Physical Medimu Dependant (PMD) sub-layer RF band signal processing part including at least one of a wave shaping 7090, an I/Q modulation 7100, and a DAC 7110. A function description of each block is as follows.

The scrambler 7010 may perform an XOR operation of input bit stream with a Pseudo Random Binary Sequence (PRBS) to randomize the input bit stream. The FEC encoder 5020 may add redundancy to transmission data so that the reception side corrects an error on a transmission channel. In order to correspond to a burst error, the interleaver 7030 may interleave input data/bit string based on the interleaving rule. In an embodiment, when deep fading or erasure is applied to a QAM symbol, interleaved bits are mapped to each QAM symbol and thus an error may be prevented from occurring in continuous bits of the entire code word bits. The mapper 7040 may allocate the inputted bit word to single constellation. The pilot insertion 7050 inserts a reference signal into a predetermined position of a signal block. When using such a reference signal, the receiver may estimate a channel distortion phenomenon such as channel estimation, frequency offset, and timing offset.

The IFFT 7060, i.e., the inverse waveform transform block may convert an input signal so that transmission efficiency and flexibility is enhanced in consideration of a system structure and characteristics of a transmission channel. In an embodiment, in the case of the OFDM system, the IFFT 7060 may convert a signal of a frequency domain to a signal of a time domain using an inverse FFT operation. The IFFT 7060 may not be used or omitted in the case of a single carrier system. In order to minimize an influence of delay spread of a transmission channel, the guard insertion 7070 may insert a guard interval between adjacent signal blocks. In an embodiment, in the case of the OFDM system, the guard insertion 7070 may insert a cyclic prefix into a guard interval segment. In order to enable a receiver to quickly and efficiently detect a target signal, the preamble insertion 7080 may insert a signal of the determined type, i.e., a preamble into a transmission signal during a transmission and reception period. In the embodiment, in the OFDM system, the preamble insertion 7080 may define a signal block/signal frame including a plurality of OFDM symbols and insert a preamble symbol into a start portion of the signal block/signal frame.

The wave shaping 7090 may perform waveform processing of an input baseband signal based on channel transmission characteristics. In an embodiment, in order to obtain a reference of out-of-band emission of a transmitted signal, the waveform shaping 7090 may perform square-root-raised cosine (SRRC) filtering. In the case of a multi-carrier system, the waveform shaping block 5090 may not be used or omitted. The I/O modulator 7100 may perform in-phase and quadrature modulation. The Digital to Analog Converter (DAC) 7110 may convert and output an input digital signal to an analog signal. An output analog signal may be transmitted through an output antenna.

Each of the blocks illustrated and described in FIG. 7 may be omitted or replaced by another block having a similar or identical function. Blocks of FIG. 7 may be configured with all or some combinations, as needed.

FIG. 8 illustrates a V2X communication message set according to an embodiment of the present invention. The message set of the embodiment of FIG. 8 may be a message set generated in the facility layer of the above-described V2X device. In this specification, the message set may be referred to as a V2X message set or an application set.

As shown in FIG. 8, the message set (or V2X message set) may include at least one message (or V2X message). In an embodiment, each message may be configured with a data frame and/or a data element. The concept of each thereof is described as follows.

Message set: the message set is a collection of messages related to an operation of the V2X device. For example, the V2X message set may be a collection of messages such as a message defined in the Society of Automotive Engineers (SAE) J2735 standard, for example, a BasicSafetyMessage (BSM), a RoadSideAlert, and a PersonalSafetyMessage.

The message: the message is a set of data elements and data frames that may be transmitted in a single unit between the V2X devices. For example, the V2X message may be a BSM message in a message set defined in the J2735 standard. In another example, the V2X message may be Cooperative Awareness Messages (CAM) or Decentralized Environmental Notification Messages (DENM) defined in the ETSI EN-302-637 Standard.

Data frame: the data frame is one of message configurations and refers to an array of at least two data. In an embodiment, the data frame may be a list of data elements and/or a list of a data frame. For example, the data frame may be BSMcoreData representing core data always included in the above BSM message. The BSM core data may be represented with a list of data elements.

Data element: the data element is one of message configurations and represents an expression of single information. That is, the data element provides a description of interested information of a minimum unit. For example, the data element may be speed data representing a speed of a vehicle in the above-mentioned core data. The data element is regarded as an indivisible element. In other words, the data elements cannot be a list of other data elements or data frames.

In an embodiment, a V2X message or a message set including the same may be represented based on an Abstract Syntax Notation One (ASN.1) method. The ASN.1 method is used for describing a data structure and also specifies encoding/decoding rule of data. The ASN.1 method corresponds to the Consultative Committee on International Telegraphy and Telephony X.208 (CCITT) and international Organization for Standardization (ISO 8824) common standard. The ASN.1 method has a characteristic that is not dependent on a specific device, a data representation method, a programming language, and a hardware platform. That is, ASN.1 corresponds to a language for describing data regardless of a platform. Therefore, when the V2X message is represented based on ASN.1, V2X devices operating different platforms have the advantage that communication of a V2X message is available. Hereinafter, an example of the V2X message described with the ASN.1 method will be described with reference to FIG. 9.

FIG. 9 illustrates an example of a message in the V2X communication message set of FIG. 8. In particular, FIG. 9 illustrates an example of a V2X message in a V2X message set. In the embodiment of FIG. 9, the V2X message may be a vehicle safety related message, for example, a BSM message defined in the SAE J2735 standard. The BSM message is a most basically used message of messages defined in the SAE J2735 standard and is a message that provides vehicle safety related information. Such a BSM message may be used in various applications for exchanging security data related to a vehicle status. In this specification, the BSM message may be referred to as a safety message or a vehicle safety message.

As shown in FIG. 9, the BSM message may be represented based on an Abstract Syntax Notation One (ASN.1) method. Further, the BSM message may be configured with at least one data part (or data container). For example, the BSM message may include a first data part and/or a second data part. The first data part indicates a part (or container)

including core data always transmitted in all BSM messages, and the second data part indicates a part (or container) including data optionally included in the BSM message. In this specification, the first data part may be referred to as a first part, a main part, a common part, and a core part. Further, the second data part may be referred to as a second part, a sub-part, a specific part, and a non-core part.

In an embodiment, a core data included in the first data part is a data frame and may be configured with a plurality of data elements such as a plurality of data IDs, latitudes (lat), longitudes (long), speeds, and sizes. Thereby, basic information of a vehicle such as ID, latitude, longitude, speed, and a size of the vehicle may be provided. In an embodiment, in order to periodically provide basic information of the vehicle to a peripheral device, the V2X device may periodically transmit (or broadcast) a BSM message. For example, the V2X device may transmit the BSM message in a cycle of 100 msec, i.e., a cycle of 10 times per second.

The above BSM message is mainly used as a V2V message for providing vehicle safety related information between vehicles, but the present invention is not limited thereto and may be used as, for example, a V2I message or a V2O message for providing vehicle safety related information between a vehicle and an infrastructure or between a vehicle and others. Further, in the above embodiments, only a message structure and characteristics of the BSM message have been described, but the same description as or a description similar thereto may be applied to other V2X messages. For example, the V2I message may have the same structure as the message structure of the above-described BSM message. For example, the V2I message may include the first data part (or container) and the second data part (or container).

FIG. 10(a) illustrates a method in which a V2X communication device processes a V2X message according to an embodiment of the present invention. In particular, the embodiment of FIG. 10(a) illustrates a method in which the V2X communication device of FIG. 1 processes a V2X message for transmission and reception of a V2X message. Further, FIG. 10(b) illustrates an exemplary structure of a WSM message processed by the processing method of FIG. 10(a), and FIG. 10(c) illustrates an exemplary structure of an LLC packet processed by the processing method of FIG. 10(a).

The V2X communication device may generate a V2X message (or V2X message set) through facility layer processing. In an embodiment, the V2X communication device may generate a V2X message through facility layer processing based on information (or upper layer information) received from the application layer. In this case, the V2X communication device may generate a V2X message of a predefined format. For example, the V2X communication device may generate a V2X message using a message dictionary defined in the SAE J2735 standard. In this case, the generated V2X message may have, for example, a message format of FIG. 9. As described above, the V2X messages may include a V2V message for communication between vehicles, a V2I message for communication between a vehicle and an infrastructure, and/or a V2O message for communication between a vehicle and others.

Next, the V2X communication device may perform network/transport layer processing of a V2X message. In an embodiment, the V2X communication device may process a V2X message based on a WSMP protocol to generate a WSM message (or packet). The WSM message generated in this way may include a data part and a header part (or WSMP header) including a V2X message, as shown in FIG. 10(a). In this specification, data included in the data part of the WSM message may be referred to as WSM data. Further, a header of the WSM message may be referred to as a WSMP header. Further, the WSM message may be referred to as a WSMP packet or a WSM packet.

Referring to FIG. 10(b), the header part of the WSM message may include a version field, a Provider Service Identifier (PSID) field, an expansion field, a WSMP WAVE Element ID field and/or a length field. A description of each field is as follows.

The version field represents a version of the WSM protocol (WSMP). In an embodiment, the version field may be a field of 1 byte, 4 bits may be reserved for future use, and the remaining 4 bits may be used for representing a version of the WSMP.

The PSID field represents a provider service identifier (PSID) value used for determining an appropriate upper layer destination of the WSM message. In an embodiment, the PSID field may be a 4-byte field.

The extension field is a field for extension of the WSMP header and may be used for representing, for example, a channel number, a data rate, and transmit power used.

The WSMP WAVE Element ID field represents a type of the WSM message. In an embodiment, the WSMP WAVE Element ID field may be a field of 1 byte.

The length field represents a length of a WSM message. In an embodiment, the length field may be a field of 2 bytes, and 4 bits may be reserved for future use, and the remaining 12 bits may be used for representing a length of WSM data.

Next, the V2X communication device may perform LLC layer processing of a V2X message. In an embodiment, the V2X communication device processes a WSM message (or WSM packet) based on an LLC layer protocol to generate an LLC packet. The LLC packet generated in this way may include a data part and a header part including a WSM packet, as shown in FIG. 10(a). In an embodiment, the header part of the LLC packet may include an LLC header and/or a Subnetwork Access Protocol (SNAP) header. In an embodiment, the SNAP header may be an optional header. In this specification, an entire header including an LLC header and an SNAP header may be referred to as an LLC packet header.

Referring to FIG. 10(c), the LLC header may include a Destination SAP (DSAP) field, a Source SAP (SSAP) field and/or a control field. Further, the SNAP header may include a protocol ID field and/or an Ethertype field. A description of each field is as follows.

The DSAP field provides information on a SAP of a destination, and the SSAP provides information on a SAP of a source. In an embodiment, the DSAP field and the SSAP field each are a field of 1 byte and may be used as a value for distinguishing an upper layer protocol.

Because the DSAP field and the SSAP field each have a length of 1 byte, it is difficult to distinguish a large number of upper layer protocols with only the two fields. Therefore, an SNAP header may further be used as additional information. When an SNAP header is included in an LLC packet header, a value of the DSAP field and the SSAP field may be set to a specific first value (0xAA). In this case, a first value of the DSAP field and the SSAP field indicates that the SNAP field is used.

The control field is a field of 1 byte and represents a type of an LLC packet.

The protocol ID field is a field of 3 bytes and represents an ID of an upper layer protocol. An Ethertype field is a field of 2 bytes and represents a type of an upper layer protocol.

Such a protocol ID field and Ethertype field may be used for distinguishing an upper layer protocol.

In an embodiment, an Ethertype field within an SNAP header may provide information for distinguishing IP data and WSMP data.

At the transmitter side, the V2X communication device may set an Ethertype field to a first value (e.g., 0x88DD) and send down an IP packet to an IP data path when transmitting IP data including a V2X message. Alternatively, when transmitting WSMP data including a V2X message, the V2X communication device may set an Ethertype field to a second value (e.g., 0x86DC) different from a first value and send down a WSM packet to a WSMP path. Thereby, the V2X communication device may divide and transmit IP data and WSMP data. Here, the IP path means a path according to an UPT (or TCP)/IP protocol, and the WSMP path means a path according to a WSMP protocol.

At the receiver side, the V2X communication device parses an LLC packet to determine a value of the Ethertype field, and when a value of the Ethertype field is a first value, the V2X communication device may send up an IP packet to an IP packet path, and when a value of the Ethertype field is a second value, the V2X communication device may send up a WSM packet to a WSMP path.

Next, the V2X communication device may perform MAC layer processing of a V2X message. In an embodiment, the V2X communication device may process an LLC packet based on the MAC layer protocol to generate an MAC packet. The generated MAC packet (or MAC protocol data unit (PDU)) may include an MAC header part, an MAC trailer part and/or a data part (or MAC service data unit (SDU)). In an embodiment, the MAC trailer part may include a frame check sequence (FCS) field.

Next, the V2X communication device may perform physical layer processing of a V2X message. In an embodiment, the V2X communication device may process an MAC packet based on a physical layer protocol to generate a signal frame. Further, the V2X communication device may transmit a communication signal including a signal frame. Thereby, the V2X message may be transmitted to the V2X communication device of the receiver side. Such physical layer processing is the same as that described with reference to FIG. 7. In this specification, the signal frame may be referred to as a message frame or a V2X message frame.

The V2X communication device of the receiver side may perform a reverse process of the above-described process to obtain a V2X message. The V2X communication device may receive a communication signal including a signal frame. The V2X communication device may parse a signal frame through physical layer parsing to obtain an MAC packet, obtain an LLC packet through MAC layer parsing, obtain a WSM packet or an IP packet through LLC layer parsing, and obtain a V2X message through network/transport layer parsing. The V2X communication device of the receiver side may provide an application service using the obtained V2X message.

In the above-described embodiment, in an embodiment in which a V2X message of a WSM message format is generated and is processed based on the WSM protocol, i.e., is processed in a WSMP data path, a processing process of the V2X message has been described, but the scope of the present invention is not limited to the above-described embodiment. For example, a V2X message of an IP data format may be generated, and in this case, the V2X message may be processed according to an IP data path.

Further, in the above embodiment, an embodiment has been described in which the V2X communication device processes a single message for transmission and reception of a message unit, but the same description or a similar description may be applied to an embodiment of processing a message set for transmission and reception of a message set unit. The above-described processing process of the V2X message may be performed by at least one processor included in the V2X communication device.

FIG. 11 illustrates a method in which a V2X communication device processes a V2X message according to another embodiment of the present invention. In particular, an embodiment of FIG. 11(b) illustrates a method in which the V2X communication device of FIG. 2 processes a V2X message for transmission and reception of a V2X message. Further, FIG. 11(b) illustrates an exemplary structure of a BTP packet processed by the processing method of FIG. 11(a), and FIG. 11(c) illustrates an exemplary structure of a geonetworking packet processed by the processing method of FIG. 11(a). As described above, each layer of the V2X communication device of FIG. 2 may perform the same function as or a function similar to that of each layer corresponding to the V2X communication device of FIG. 1. Therefore, in FIG. 11, a description corresponding to that of the embodiment of FIG. 10 is omitted.

The V2X communication device may generate a V2X message (or V2X message set) through facility layer processing. In this case, the V2X communication device may generate a V2X message of a predefined format. The generated V2X messages may have a periodic message format such as Co-operative Awareness Messages (CAM) or an event message format such as Decentralized Environmental Notification Messages (DENM). Here, the event message indicates a message triggered by detection of an event to be transmitted.

Next, the V2X communication device may perform network/transport layer processing of a V2X message. First, the V2X communication device may process a V2X message based on a BTP protocol to generate a BTP packet. The generated BTP packet may include a data part and a header part including a V2X message, as shown in FIG. 11(a).

Referring to FIG. 11(b), the header part of the BTP packet may include a destination port field and/or a transmission position port field. A description of each field is as follows.

The destination port field indicates a port of a protocol entity in a facility layer of a destination of a BTP packet. The transmission position port field (or source port field) indicates a port of a protocol entity in a facility layer of a source of a BTP packet.

Next, the V2X communication device may process a V2X message based on a geonetworking protocol to generate a geonetworking packet. The generated geonetworking packet may include a data part and/or a header part including a V2X message, as shown in FIG. 11(a). In this specification, the header part of the geonetworking packet may be referred to as a geonetworking header.

Referring to FIG. 11(c), the header part of the geonetworking packet may include a basic header, a common header and/or an extension header. In an embodiment, the extension header may be an optional header.

In an embodiment, the basic header may include a version field, a next header (NH) field, a life time (LT) field, and/or a reserved field.

The version field is a field of 4 bits and represents a version of a geonetworking protocol. The NH field is a field of 4 bits and represents a type of a header located immediately after the basic header. The LT field is a field of 1 byte and represents a maximum tolerable time that may be buffered until a geonetworking packet arrives at a destination. The reserved field is a field of 1 byte and is a field reserved for future use.

In an embodiment, the common header may include a NH field, a header type (HT) field, a header sub-type (HST) field, a traffic class (TC) field, a flags field, a payload length (PL) field, a maximum hop limit (MHL) field and/or a reserved field.

The NH field is a field of 4 bits and represents a type of a header located immediately after the geonetworking header. The HT field is a field of 4 bits and represents a type of a geonetworking header. The HST field is a field of 4 bits and represents a sub-type of the geonetworking header. The TC field represents a traffic class representing facility layer requirement for packet transmission. The flag field is a field of 1 byte, and a 0th bit indicates whether an ITS station (or V2X communication device) is mobile or stationary, and bits from a first bit to a seventh bit may be reserved for future use. The PL field is a field of 2 bytes and represents a length of a data part (or payload) of the geonetworking packet. The MHL field is a field of 1 byte and represents the maximum hop limit. The reserved field is a field of 1 byte and is a field reserved for future use. In an embodiment, the extension header is an optional header and may include at least one additional field according to a geonetworking mode. The geonetworking mode may include, for example, a broadcasting mode, an anycasting mode, and a unicasting mode. In an embodiment, an extension header of a geonetworking packet transmitted in a unicasting mode may include a sequence number (SN) field, a source position vector (SO PV) field, a destination position vector (DE PV) field and/or a reserved field.

The SN field represents an index of the geonetworking packet. In an embodiment, the SN field may be used for detecting a duplicate geonetworking packet. The SO PV field represents a long position vector including a reference position of a source. The DE PV field represents a shot position vector including a position of a destination.

Next, the V2X device may perform LLC layer processing, MAC layer processing, and physical layer processing of a V2X message. Further, the V2X communication device of the receiver side may perform reverse processes of the above-described process to obtain a V2X message. This is described with reference to FIG. 10 and therefore a detailed description thereof is omitted.

In the above embodiment, in an embodiment in which a V2X message of a CAM message or DENM message format is generated and is processed based on a BTP protocol and a geonetworking protocol, i.e., is processed in a BTP/geonetworking data path, a processing process of a V2X message has been described, but the scope of the present invention is not limited to the above-described embodiment. For example, a V2X message of an IP data format may be generated, and in this case, the V2X message may be processed according to an IP data path.

Further, in the above embodiment, an embodiment has been described in which the V2X communication device processes a single message for transmission and reception of a message unit, but the same or similar description may be applied to an embodiment of processing a message set for transmission and reception of a message set unit. The above-described processing process of the V2X message may be performed by at least one processor included in the V2X communication device.

FIG. 12 illustrates a structure of a V2I message according to an embodiment of the present invention. FIG. 12(a) illustrates a concept structure of a V2I message according to an embodiment of the present invention, and FIG. 12(b) illustrates a specific example of a V2I message according to an embodiment of the present invention.

The V2I message refers to as a V2X message for a V2I application (or V2I service). That is, the V2I message may be a V2X message for communication or a service between a vehicle and an infrastructure. For example, as shown in FIG. 12(b), the V2I message may be a message for a V2I application providing a work zone safety related service. In this specification, the work zone safety related service may be a service that provides information related to safety of a work zone, for example, information on a position of a work zone, information on a position and length of a work segment, information on a position and number of an worker in a work zone, and information on a position and number of a heavy equipment in a work zone.

Referring to FIG. 12(a), the V2I message may include a common container and/or at least one application container.

The common container refers to a container including information (or data) commonly used in a V2I application. That is, the common container may be a container including information commonly used in order to provide a V2I service. In an embodiment, the common container may include common information (or core information) for a V2I application, for example, ID related information, event related information, position information and/or lane information. In this specification, the common container may be referred to as a first container, a first data part, a first sub-message, a main part, and a core part.

The application container refers to a container including information (or data) used for a specific V2I application. That is, the application container may be a container including information used for a specific V2I service. For example, the application container may be a container including specific information for a specific V2I application, for example, a work zone application of FIG. 12(b).

In this specification, a V2I application that provides a work zone safety related service may be referred to as a work zone safety application or a work zone application. In this specification, a container including information for a work zone application may be referred to as a work zone safety container or a work zone container. In this specification, the application container may be referred to as a second container, a second data part, a second sub-message, a sub-part, and a non-core part.

In an embodiment, in order to periodically provide common information for a V2I service to a peripheral device, the V2X device may periodically transmit (or broadcast) a V2I message including a common container. For example, the V2X device may transmit a V2I message including a common container in a cycle of 100 msec, i.e., a cycle of 10 times per second. Further, in order to provide specific information for a specific V2I service to a peripheral device, the V2X device may periodically transmit (or broadcast) a V2I message including an application container or may transmit a V2I message including an application container on demand. In an example, a period of transmitting a V2I message including the application container may be longer than that of transmitting a V2I message including a common container.

As described above, the V2I message may have a message structure of FIG. 12, but it is not limited thereto. For example, the V2I message may have a V2X message structure described in FIGS. 8 and 9. Further, a message structure of FIG. 12 may be applied to vehicle related messages (e.g., V2X message, V2O message) having other forms and names.

In the above-described embodiment, common information for a V2I service and specific information for a specific V2I service may be included in different containers, but the present invention is not limited thereto. According to an embodiment, common information for a V2I service and specific information for a specific V2I service may be included in a single container. For example, a V2I message may include a single container, and the single container may include both common information for a V2I service and specific information for a specific V2I service.

FIG. 13 illustrates a common container of a V2I message according to an embodiment of the present invention. FIG. 13 illustrates a first embodiment of a common container in a V2I message for a V2I service. In the embodiment of FIG. 13, a common container of a V2I message may be represented based on the ASN.1 method. Further, in the embodiment of FIG. 13, the common container may be configured with a sequence of at least one data element and/or at least one data frame.

Referring to FIG. 13, the common container may include ID related information, event related information, position related information and/or lane related information.

In an embodiment, ID related information may include message ID (msgID) information, station ID (StationID) information, event ID (eventide) information and/or segmented ID (segmentedID) information.

The message ID (msgID) information represents a type (or identifier) of the corresponding message. In an embodiment, the message ID information may correspond to 'DE_DSRC_MessageID2', which is data element defined in the SAE J2735 standard or may be newly defined with reference to the DE_DSRC_MessageID2.

The station ID (StationID) information represents an identifier of a station that detects an event. In an embodiment, the station ID information may correspond to 'DE_TemporaryID', which is a data element defined in the SAE J2735 standard or may be newly defined with reference to the DE_TemporaryID. The station ID information may be optionally used.

The event ID (eventID) information represents an identifier of a regionally unique or randomly generated event. That is, the event ID information is a value uniquely randomly generated in the corresponding region and may be used for identifying the corresponding event. In an embodiment, event ID information may be an unsigned 16-bit integer.

The segmented ID (segmented ID) information represents an identifier used for connecting a plurality of basic information messages (BIM) describing a complex event. In an embodiment, the segmented ID information may be an unsigned 16-bit integer. The segmented ID information may be optionally used.

In an embodiment, the event related information may include detection time (detTime) information and/or valid duration (validityDur) information.

The detection time (detTime) information represents when an event is detected. In an embodiment, the detection time information may correspond to 'DF_DDateTime', which is a data frame defined in the SAE J2735 standard or may be newly defined with reference to the DF_DDateTime. The detection time information may be optionally used.

The validity duration (validityDur) information represents a duration in which the corresponding message is valid. In an embodiment, the validity duration information may be an unsigned 17-bit integer representing a second. The validity duration information may optionally be used.

In an embodiment, the position related information may include reference position (refPos) information, position accuracy (posAcc) information, heading information and/or heading reliability (HeadingConf) information.

The reference position (refPos) information may represent information on a reference position related to an event. In an embodiment, the reference position information may provide information on a reference position related to an event, for example, information on a position of a start point at which an event has occurred. For example, when an event is an event related to work zone safety, the reference position information may represent a reference position (e.g., a position of a first start point of a work zone) of a work zone.

In the embodiment of FIG. 13, a common container may include reference position information representing a single reference position. In this case, a single V2I message may include only information on a single reference position. In an embodiment, reference position information may correspond to 'DF_Position3D', which is a data frame defined in the SAE J2735 standard or may be newly defined with reference to the DF_Position3D.

The position accuracy (posAcc) information represents a used localization solution (localization solution). That is, the position accuracy information may provide information on a localization method to be used. In an embodiment, the position accuracy information may correspond to 'DF_PositionalAccuracy', which is a data frame defined in the SAE J2735 standard or may be newly defined with reference to the DF_PositionalAccuracy. The position accuracy information may be optionally used.

The heading information illustrates a direction of an event. In an embodiment, the heading information may correspond to 'DE_Heading', which is a data element defined in the SAE J2735 standard or may be newly defined with reference to the DE_Heading. The heading information may be optionally used.

The heading reliability (HeadingConf) information represents reliability of heading of an event. In an embodiment, the heading reliability information may correspond to 'DE_HeadingConfidence', which is a data element defined in the SAE J2735 standard or may be newly defined with reference to the DE_HeadingConfidence. The heading reliability information may be optionally used.

In an embodiment, the lane related information may include speed limit (speedLimits) information, traffic direction (traffDir) information, width information and/or approach path (approachpath) information.

The speed limit (speedLimits) information represents speed limit of a current event. In an embodiment, the speed limit information may correspond to a sequence of 'DF_NodeList', which is a data frame defined in the SAE J2735 standard or may be newly defined with reference to the sequence. In this case, the speed limit information may provide information on a plurality of lane speed limits according to a size of a sequence. For example, when a size of the sequence is 10, the speed limit information may provide information on speed limit of each of 10 lanes. The speed limit information may be optionally used.

The traffic direction (traffDir) information may represent a traffic direction of an event. In an embodiment, the traffic direction information may correspond to 'DE_DirectionOfUse', which is a data element defined in the SAE J2735 standard or may be newly defined with reference to the DE_DirectionOfUse. The traffic direction information may be optionally used.

The width information represents a width of a road at a reference position. In an embodiment, the width information may correspond to 'DE_LaneWidth', which is a data element defined in the SAE J2735 standard or may be newly defined with reference to the DE_LaneWidth. The width information may be optionally used.

The approach path (approachpath) information represents an approach path to be connected to an event for a matching purpose. In an embodiment, the approach path information may correspond to a sequence of 'DF_NodeList', which is a data element defined in the SAE J2735 standard or may be newly defined with reference to the sequence. In this case, the approach path information may provide information on a plurality of lane approach paths according to a size of the sequence. For example, when a size of the sequence is 10, the approach path information may provide information on an approach path to an event of each of 10 lanes. The approach path information may be optionally used.

FIG. 14 illustrates an application container in a V2I message according to an embodiment of the present invention. In particular, FIG. 14 illustrates a first embodiment of an application container in a V2I message for a work zone safety related service (or application) according to an embodiment of the present invention. In the embodiment of FIG. 14, the application container may be represented based on the ASN.1 method. Further, in the embodiment of FIG. 14, the application container may be configured with a sequence of at least one data element and/or at least one data frame.

Referring to FIG. 14, the application container may include lane status (laneStatus) information, lane closed segment (laneClosOffsets) information, geometry information, length information and/or worker present (wokersPresent) information.

The lane status (laneStatus) information represents a closed lane and an open lane in a driving direction. That is, the lane status information may provide information on whether each lane is a closed lane or an open lane in a driving direction. For example, the lane status information may be a field of 11 bits describing 10 lanes. In an embodiment, the lane status information may correspond to a sequence of 'DE_LaneStatus', which is a data element defined in the SAE J2735 standard or may be newly defined with reference to the sequence. In this case, the lane status information may provide information on a lane status of a plurality of lanes according to a size of a sequence. For example, when a size of the sequence is 10, the lane status information may provide information on a lane status of each of 10 lanes.

The lane closed segment (laneClosOffsets) information represents a distance from a reference position to a closed lane. The lane closed segment information may provide information on an offset distance from a reference position of each lane to a start point or an end point of a closed lane. In an embodiment, the lane closed segment information may correspond to a sequence of 'DE_ObstacleDistance', which is a data element defined in the SAE J2735 standard or may be newly defined with reference to the sequence. In this case, the lane closed segment information may provide a distance from a plurality of reference positions to a closed lane according to a size of a sequence. For example, when a size of the sequence is 10, the lane closed segment information may provide a distance from a reference position of each of 10 lanes to a start point or an end point of a closed lane. In an embodiment, when the lane closed segment information indicates a distance from a reference position to a start point of a closed lane, information on a work segment of the corresponding lane may be determined based on lane closed segment information and length information.

The geometry information may represent a geographic position of a work zone. In an embodiment, the geometry information may correspond to a 'DF_RoadSegmentList', which is a data frame defined in the SAE J2735 standard or may be newly defined with reference to the 'DF_RoadSegmentList'.

The length information may represent a length of a work zone. For example, the length information may be an unsigned 15-bit integer representing a meter. In the embodiment of FIG. 14, an application container may include length information representing a single length. In this case, a single V2I message may include only length information of a single work zone. In an embodiment, the length information may correspond to a 'DE_Length', which is a data element defined in the SAE J2735 standard or may be newly defined with reference to the DE_Length.

The worker present (wokersPresent) information may indicate whether a worker exists in a work zone. For example, the worker information may be a 1-bit flag. In an embodiment, the worker information may correspond to 'DE_Activity', which is a data element defined in the SAE J2735 standard or may be newly defined with reference to the 'DE_Activity'.

FIG. 15 illustrates a method in which a V2X communication device provides work segment related information based on a V2I message according to an embodiment of the present invention. In particular, FIG. 15 illustrates a method in which the V2X communication device provides work segment related information to a peripheral V2X communication device based on a V2I message including the common container of FIG. 13 and the application container of FIG. 14.

In an embodiment of FIG. 15, the V2X communication device may correspond to an RSU of an infrastructure (e.g., traffic light) located at a periphery of a work zone or may be a device included in the RSU, and the peripheral V2X device may correspond to an OBU of a vehicle at a periphery of a work zone or may be a device included in the OBU. In this specification, work zone related information may be information related to a work segment in the work zone and may be information on, for example, a position (start position or end position) of a working segment or a length of a working segment.

In an embodiment of FIG. 15, the V2X communication device may provide information about a restricted area of a work zone using single reference position information of a common container and lane closed segment information of an application container. In the embodiment of FIG. 15, it is assumed that lane closed segment information represents a distance from a reference position of each lane to an end point of a closed lane (or lane close).

In an embodiment of FIG. 15(a), as shown, it is assumed that a construction is performed in a first lane and a second lane, in the first lane, a construction of a length of 200 meters from a reference position is performed, and in the second lane, a construction of a length of 50 meters from the reference position is performed.

In this case, the V2X communication device may set a value of lane closed segment information (laneClosOffset[1]) of the first lane to 200 and set a value of lane closed segment information (laneClosOffset[2]) of the second lane to 50 to display a work segment (or lane closed segment) of the corresponding lane. In this case, the lane closed segment information may be a value set in a meter (m) unit.

The V2X communication device may transmit a V2 message including lane closed segment information set in this way to provide information on a work segment of a work zone to a peripheral V2X communication device. In this case, the V2X communication device may transmit a V2I message to the peripheral V2X communication device through the V2X message processing method described with reference to FIGS. 10 and 11. Thereby, the peripheral V2X communication device may obtain information on a lane closed segment of the work zone to provide a security alarm to a user based on the information. In this case, the peripheral V2X communication device may obtain a V2I message through the V2X message processing method described with reference to FIGS. 10 and 11.

However, as in an embodiment of FIG. 15, when setting a restricted area of a work zone using lane closed segment information and single reference position information included in a V2I message, due to a limit of information that may be provided by a combination of two information, there is a case in which lane closed segment information should be set to a value larger than an actual work segment. In this case, a segment in which actual driving is available may be set to a lane closed segment to cause inconvenience to the user. This will be described below with reference to FIG. 15(b).

In the embodiment of FIG. 15(b), as shown, it is assumed that a construction is performed in a first lane and a second lane, in the first lane, a construction of a length of 200 meters from a reference position is performed, and in the second lane, a construction of a length of 50 meters from a point apart 150 meters from the reference position is performed.

In this case, the V2X communication device may set lane closed segment information (laneClosOffset[1]) of the first lane to 200. However, in the case of the second lane, because the lane closed segment information represents an offset distance from a reference position to an end point of a closed lane, the V2X communication device should set lane closed segment information (laneClosOffset[2]) of the second lane to 200. Thereby, the V2X communication device may provide information on a restricted area of the work zone to the peripheral V2X communication device, and the peripheral V2X communication device may provide a safety alarm to a user based on the information.

In this way, in the embodiment of FIG. 15(b), due to a limit of information that may represent with a combination of single reference position information and lane closed segment information, the V2X communication device notifies the peripheral V2X communication device of, as a lane closed segment, a segment up to 150 meters from a reference position, which is a segment in which actual driving is available at the second lane. This causes inconvenience to a user who receives a security alarm from the peripheral V2X communication device. Therefore, a restricted area setting method of a work zone using a V2I message of an additional or alternative method for solving such a problem is required.

FIG. 16 illustrates an application container in a V2I message according to another embodiment of the present invention. In particular, FIG. 16 illustrates a second embodiment of an application container in a V2I message for a work zone safety related service (or application) according to an embodiment of the present invention. In the embodiment of FIG. 16, the application container may be represented based on the ASN.1 method. In an embodiment of FIG. 16, a description corresponding to that of FIG. 14 is omitted.

Referring to FIG. 16, a work zone container may include lane status (laneStatus) information, lane closed segment (laneClosOffsets) information, lane closed start segment (laneClosStartOffsets) information, geometry information, length information and/or worker present (wokersPresent) information. That is, the work zone container may further include lane closed start segment information. Here, lane status information, geometry information, length information, and worker information is the same as that described with reference to FIG. 14 and therefore a detailed description thereof is omitted. In the embodiment of FIG. 16, it is assumed that lane closed segment information represents a distance from a reference position of each lane to an end point of a closed lane (or lane close).

In the embodiment of FIG. 16, the lane closed start segment information represents a distance from a reference position to a position (or point) in which a closed lane is started. For example, the lane closed start segment information may provide an offset distance from a reference position to a point in which a closed lane is started. In an embodiment, the lane closed segment information may correspond to a sequence of 'DE_ObstacleDistance', which is a data element defined in the SAE J2735 standard or may be newly defined with reference to the sequence. In this case, the lane closed segment start information may provide a plurality of closed lane start distances according to a size of the sequence. For example, when a size of the sequence is 10, the lane closed segment start information may provide a distance from a reference position of each of 10 lanes to a start point of a closed lane.

FIG. 17 illustrates a method in which a V2X communication device provides work segment related information based on a V2I message according to an embodiment of the present invention. In particular, FIG. 17 illustrates a method in which a V2X communication device provides work segment related information based on a V2I message including the common container of FIG. 13 and the application container of FIG. 16 to a peripheral V2X communication device. In FIG. 17, a description corresponding to that described in FIG. 15 is omitted.

In an embodiment of FIG. 17, the V2X communication device may provide information about a restricted area of a work zone using single reference position information of a common container and lane closed segment information and lane closed segment start information of an application container. In the embodiment of FIG. 17, it is assumed that lane closed segment information represents a distance from a reference position of each lane to an end point of a closed lane (or lane close).

In the embodiment of FIG. 17, as shown, it is assumed that a construction is performed in a first lane and a second lane, in the first lane, a construction of a length of 200 meters from a reference position is performed, and in the second lane, a construction of a length of 50 meters from a point apart 150 meters from the reference position is performed.

In this case, the V2X communication device may set lane closed segment start information (laneClosStartOffset[1]) of the first lane to 0, set lane closed segment information (laneClosOffset[1]) to 200, set lane closed segment start information (laneClosStartOffset[2]) of the second lane to 150, and set lane closed segment information (laneClosOffset[2]) to 50 to display the work segment (or lane closed segment). In this case, the lane closed segment information may be a value set in a meter (m) unit.

Thereby, in the case of the first lane, a segment from a reference position to 200 meters may be set to a lane closed segment, and in the case of the second lane, a segment from a reference position to 150 meters may be set to a lane open segment, and a segment from 150 meters to 50 meters may be set to a lane closed segment. Therefore, the V2X communication device may provide more accurate information on a restricted area of a work zone to a peripheral V2X communication device, compared to the embodiment of FIG. 15, and the peripheral V2X communication device may provide an accurate safety alarm to the user based on the information.

That is, by transmitting a V2I message further including lane closed segment start information, the V2X communication device may provide information on a restricted area of an accurate work zone of each lane to the peripheral V2X communication device. Thereby, user inconvenience according to provision of an inaccurate stable alarm can be solved. In this case, transmission and reception processing of a V2I message in the V2X communication device or the peripheral V2X communication device follows the V2X message processing method described with reference to FIGS. 10 and 11.

FIG. 18 illustrates an application container in a V2I message according to another embodiment of the present invention. In particular, FIG. 18 illustrates a third embodiment of an application container in a V2I message for a work zone related safety service (or application) according to an embodiment of the present invention. In the embodiment of FIG. 18, the application container (or work zone container) may be represented based on the ASN.1 method. In the embodiment of FIG. 18, a description corresponding to that of the embodiment of FIGS. 14 and 16 is omitted.

Referring to FIG. 18, the application container may include lane status (laneStatus) information, reference position offset (laneClosOffsets) information, lane closed segment (laneClosOffsets) information, geometry information, length information and/or worker present (wokersPresent) information. That is, the application container may further include reference position offset information. Here, lane status information, geometry information, length information, and worker information is the same as that described in FIG. 14 and therefore a detailed description thereof is omitted. In the embodiment of FIG. 18, it is assumed that lane closed segment information represents a distance from a reference position of each lane to an end point of a closed lane (or lane close).

In the embodiment of FIG. 18, reference position offset information represents an offset value of a reference position. Reference position offset information provides an offset value from a basic reference position for setting an actual reference position of the corresponding lane. That is, reference position offset information may provide information on an offset distance from a reference position (or basic reference position) by reference position information to an actual reference position. Such reference position offset information may be used for setting a reference position of each lane. In an embodiment, reference position offset information may correspond to a sequence of 'DE_Distance', which is a data element defined in the SAE J2735 standard or may be newly defined with reference to the sequence. In this case, reference position offset information may provide an offset value of a plurality of reference positions according to a size of the sequence. For example, when a size of the sequence is 10, reference position offset information may provide an offset value from a reference position of each of 10 lanes. Thereby, a reset reference position of each lane may be provided.

In an embodiment, when reference position offset information and lane closed segment information are together used, the lane closed segment information may provide an offset distance from a reference position (or actual reference position) reset by reference position offset information to an end point of an closed lane instead of a reference position (or basic reference position) provided by reference position information.

In the embodiment of FIG. 18, an embodiment has been described in which reference position offset information is included in the application container, but according to the embodiment, reference position offset information together with reference position information may be included in the common container.

FIG. 19 illustrates a method in which a V2X communication device provides work segment related information based on a V2I message according to an embodiment of the present invention. In particular, FIG. 19 illustrates a method in which the V2X communication device provides work segment related information based on a V2I message including the common container of FIG. 13 and the container application of FIG. 18 to a peripheral V2X communication device. In FIG. 17, a description corresponding to that described in FIG. 15 is omitted.

In an embodiment of FIG. 19, the V2X communication device may provide information about a restricted area of a work zone using single reference position information of a common container and lane closed segment information and reference position offset information of an application container. In the embodiment of FIG. 17, it is assumed that lane closed segment information represents a distance from a reference position of each lane to an end point of a closed lane (or lane close).

In the embodiment of FIG. 19, as shown, it is assumed that a construction is performed in a first lane and a second lane, in the first lane, a construction of a length of 200 meters from a reference position is performed, and in the second lane, a construction of a length of 50 meters from a point apart 150 meters from the reference position is performed.

In this case, the V2X communication device may set reference position offset information (refPosOffset[1]) of the first lane to 0, set lane closed segment information (laneClosOffset[1]) to 200, set reference position offset information (refPosOffset[2]) of the second lane to 150, and set lane closed segment information (laneClosOffset[2]) to 50 to display a work segment (or lane closed segment). In this case, the reference position offset information and the lane closed segment information may be a value set in a meter (m) unit.

Thereby, in the case of the first lane, a segment from a reference position to 200 meters may be set to a lane closed segment, and in the case of the second lane, a segment from a reference position to 150 meters may be set to a lane open segment, and a segment from 150 meters, which is a reset actual reference position to 50 meters may be set to a lane closed segment. Therefore, the V2X communication device may provide more accurate information on a restricted area of a work zone to a peripheral V2X communication device, compared to the embodiment of FIG. 15, and the peripheral V2X communication device may provide an accurate safety alarm to the user based on the information.

That is, by transmitting a V2I message further including reference position offset information, the V2X communication device may provide information on an accurate restricted area of a work zone of each lane to a peripheral V2X communication device. Thereby, user inconvenience according to provision of an inaccurate stable alarm can be solved. In this case, transmission and reception processing of a V2I message in the V2X communication device or the peripheral V2X communication device follows the V2X message processing method described with reference to FIGS. 10 and 11.

FIG. 20 illustrates a common container in a V2I message according to another embodiment of the present invention. In particular, FIG. 20 illustrates a second embodiment of a common container in a V2I message for a V2I service (or application). In the embodiment of FIG. 20, the common container may be represented based on an ASN.1 method. In FIG. 20, a description corresponding to that of FIG. 13 is omitted.

Referring to FIG. 20, the common container may include reference position (resPos) information of a sequence form instead of single reference position (redPos) information, as shown in FIG. 13. In this specification, the single reference position information of FIG. 13 may be referred to as first reference position information, and reference position information of a sequence form of FIG. 20 may be referred to as second reference position information.

In an embodiment, the second reference position information may correspond to a sequence of 'DF_Position3D', which is a data frame defined in the SAE 2735 standard or may be newly defined with reference to the sequence. In this case, the second reference position information may provide a plurality of reference position values according to a size of the sequence. For example, when a size of the sequence is 10, the reference position information may provide a reference position value of each of 10 lanes.

As described above, each reference position information may represent an event position or an event start position. Therefore, when each reference position information is configured in a sequence form, reference position information may provide a plurality of event positions or event start positions according to a size of the sequence. For example, reference position information of a sequence form may provide information such as a reference position related to a construction segment (or lane closed segment) of each lane. For example, when a size of the sequence is 10, the reference position information may provide information such as a reference position representing a start position of a construction segment of each of 10 lanes.

FIG. 21 illustrates a method in which a V2X communication device provides work segment related information based on a V2I message according to an embodiment of the present invention. In particular, FIG. 21 illustrates a method in which a V2X communication device provides work zone related information to a peripheral V2X communication device based on a V2I message including the common container of FIG. 13 and the application container of FIG. 16. In FIG. 21, a description corresponding to that described in FIGS. 15, 17, and 19 is omitted.

In an embodiment of FIG. 21, the V2X communication device may provide information about a restricted area of a work zone using reference position information of a sequence form of a common container and lane closed segment information of an application container. In the embodiment of FIG. 21, it is assumed that lane closed segment information represents a distance from a reference position of each lane to an end point of a closed lane (or lane close).

In the embodiment of FIG. 21, as shown, it is assumed that a construction is performed in a first lane and a second lane, in the first lane, a construction of a length of 200 meters from a reference position is performed, and in the second lane, a construction of a length of 50 meters from a point apart 150 meters from the reference position is performed.

In this case, the V2X communication device may set reference position information (refPos[1]) of the first lane to a first reference position in which an actual work segment is started in the first lane, set lane closed segment information (laneClosOffset[1]) to 200, set reference position information (refPos[2]) of the second lane to a second reference position in which an actual work segment is started in the second lane, and set lane closed segment information (laneClosOffset[2]) to 50 to display a work segment (or lane closed segment).

Thereby, in the case of the first lane, a segment from the first reference position (or refPos[1]) to 200 meters may be set to a construction segment, and in the case of the second lane, a segment from a second reference position (or refPos[2]) to 50 meters may be set to a construction segment. Therefore, the V2X communication device may provide more accurate information on a restricted area of a work zone to a peripheral V2X communication device, compared to the embodiment of FIG. 15, and the peripheral V2X communication device may provide an accurate safety alarm to the user based on the information.

That is, by transmitting a V2I message further including reference position information of a sequence form, the V2X communication device may provide information on an accurate restricted area of a work zone of each lane to the peripheral V2X communication device. Thereby, user inconvenience according to provision of an inaccurate stable alarm can be solved. In this case, transmission and reception processing of a V2I message in the V2X communication device or the peripheral V2X communication device follows the V2X message processing method described with reference to FIGS. 10 and 11.

In the above description described with reference to FIGS. 15 to 21, each embodiment has been described in a case in which the lane closed segment information represents a distance from a reference position of each lane to an end point of a closed lane (or lane close). However, this is an illustration, and the scope of the present invention is not limited thereto. For example, the lane closed segment information may represent a distance from a reference position of each lane to a start point of a closed lane (or lane close). In this case, lane closed segment information and length information of the application container in the V2I message may be used for providing working segment related information. Embodiments thereof are described below with reference to FIGS. 23 to 26.

FIG. 22 illustrates a method in which a V2X communication device provides work segment related information based on a V2I message according to another embodiment of the present invention. In particular, FIG. 22 illustrates a method in which the V2X communication device provides work segment related information to a peripheral V2X communication device based on a V2I message including the common container of FIG. 13 and the application container of FIG. 14. In FIG. 22, a description corresponding to that described in FIGS. 15, 17, 19, and 21 is omitted.

In an embodiment of FIG. 22, the V2X communication device may provide information about a restricted area of a work zone using single reference position information of a common container and lane closed segment information and single length information of an application container. In the embodiment of FIG. 15, it is assumed that lane closed segment information represents a distance from a reference position of each lane to a start point of a closed lane (or lane close).

In an embodiment of FIG. 22(a), as shown, it is assumed that a construction is performed in a first lane and a second lane, in the first lane, a construction of a length of 200 meters from a reference position is performed, and in the second lane, a construction of a length of 50 meters from a point apart 150 meters from the reference position is performed.

In this case, the V2X communication device may set a value of length information to 200, set a value of lane closed segment information (laneClosOffset[1]) of the first lane to 0, and set a value of lane closed segment information (laneClosOffset[2]) of the second lane to 150 to display a work segment (or lane closed segment) of the corresponding lane. In this case, length information and lane closed segment information may be a value set in a meter (m) unit.

The V2X communication device may transmit a V2I message including the lane closed segment information and the length information to provide information on a work segment of a work zone to the peripheral V2X communication device. In this case, the V2X communication device may transmit a V2I message to the peripheral V2X communication device through the V2X message processing method described with reference to FIGS. 10 and 11. Thereby, the peripheral V2X communication device may obtain information on the lane closed segment of the work zone to provide a security alarm to the user based on the information. In this case, the peripheral V2X communication device may obtain a V2I message through the V2X message processing method described with reference to FIGS. 10 and 11.

However, as in the embodiment of FIG. 22(a), when setting a restricted area of a work zone using lane closed segment information and single length information included in the V2I message, due to a limit of information that may be provided by a combination of the two information, there is a case in which an actual work segment is not accurately set. In this case, a segment in which actual driving is available may be set to a lane closed segment to cause inconvenience to the user. This is described below with reference to FIG. 22(b).

In the embodiment of FIG. 22(b), as shown, it is assumed that a construction is performed in a first lane and a second lane, in the first lane, a construction of a length of 200 meters from a reference position is performed, and in the second lane, a construction of a length of 50 meters from the reference position is performed.

In this case, the V2X communication device may set length information to 200 and set lane closed segment information (laneClosOffset[1]) of the first lane to 0. However, in the case of the second lane, because lane closed segment information represents an offset distance from a reference position to a start point of a closed lane, the V2X communication device should set lane closed segment information (laneClosOffset[2]) of a second lane to 0. Thereby, the V2X communication device may provide information on a restricted area of a work zone to the peripheral V2X communication device, and the peripheral V2X communication device may provide a safety alarm to the user based on the information.

In an embodiment of FIG. 22(b), due to a limit of information that may be represented by a combination of single length information and lane closed segment information, the V2X communication device notifies the peripheral V2X communication device of, as a lane closed segment, a segment up to 200 meters from a point apart 50 meters from a reference position, which is a segment in which actual driving is available at the second lane. This causes inconvenience to the user who receives a security alarm from the peripheral V2X communication device. Therefore, a restricted area setting method of a work zone using a V2I message of an additional or alternative method for solving such a problem is required.

FIG. 23 illustrates an application container in a V2I message according to an embodiment of the present invention. In particular, FIG. 23 illustrates a fourth embodiment of an application container in a V2I message for a work zone safety related service (or application) according to an embodiment of the present invention. In the embodiment of FIG. 23, the application container may be represented based on the ASN.1 method. In the embodiment of FIG. 23, a description corresponding to that of the embodiment of FIGS. 14, 16, and 18 is omitted.

Referring to FIG. 23, a work zone container may include lane status (laneStatus) information, lane closed segment (laneClosOffsets) information, lane closed end segment (laneClosEndOffsets) information, geometry information, length information and/or worker present (wokersPresent) information. That is, the work zone container may further include lane closed end segment information. Here, lane status information, geometry information, length information, and worker information is the same as that described in FIG. 14 and therefore a detailed description thereof is omitted. In the embodiment of FIG. 23, it is assumed that lane closed segment information represents a distance from a reference position of each lane to a start point of a closed lane (or lane close).

In the embodiment of FIG. 23, the lane closed end segment information represents a distance from a closed reference position to a position (or point) in which a closed lane is ended. For example, the lane closed end segment information may provide an offset distance from a reference position to an end point of a closed lane. In an embodiment, the lane closed end segment information may correspond to a sequence of 'DE_ObstacleDistance', which is a data element defined in the SAE J2735 standard or may be newly defined with reference to the sequence. In this case, the lane closed end segment information may provide an end distance of a plurality of closed lanes according to a size of a sequence. For example, when a size of the sequence is 10, the lane closed end segment information may provide a distance from a reference position of each of 10 lanes to an end point of a closed lane.

FIG. 24 illustrates a method in which a V2X communication device provides work segment related information based on a V2I message according to an embodiment of the present invention. In particular, FIG. 24 illustrates a method in which a V2X communication device provides work segment related information based on a V2I message including the common container of FIG. 13 and the application container of FIG. 23. In FIG. 24, a description corresponding to that described in FIGS. 15, 17, and 19 is omitted.

In an embodiment of FIG. 24, the V2X communication device may provide information about a restricted area of a work zone using single reference position information of a common container and lane closed segment information and lane closed type segment information of an application container. In the embodiment of FIG. 17, lane closed segment information may represent a distance from a reference position of each lane to a start point of a closed lane (or lane close), and lane closed segment information may represent a distance from a reference position of each lane to an end point of a closed lane (or lane close).

In the embodiment of FIG. 24, as shown, it is assumed that a construction is performed in a first lane and a second lane, in the first lane, a construction of a length of 200 meters from a reference position is performed, and in the second lane, a construction of a length of 40 meters from a point apart 10 meters from the reference position is performed.

In this case, the V2X communication device may set length information to 200, set lane closed segment information (laneClosOffset[1]) of the first lane to 0, set lane closed end segment information (laneClosEndset[1]) to 200, and lane closed segment information (laneClosffset[2]) of the second lane to 10, and set lane closed end segment information (laneClosEndOffset[2]) to 50 to display a work segment (or lane closed segment). In this case, length information, lane closed segment information, and lane closed end segment information may be a value set to a meter (m) unit.

Thereby, in the case of the first lane, a segment from a reference position to 200 meters may be set to a lane closed segment, and in the case of the second lane, a segment from a reference position to 10 meters may be set to a lane open segment, a segment from 10 meters to 50 meters may be set to a lane closed segment, and a segment from 50 meters to 200 meters may be set to a lane open segment. Therefore, the V2X communication device may provide more accurate information on a restricted area of a work zone to the peripheral V2X communication device, compared to the embodiment of FIG. 15, and the peripheral V2X communication device may provide an accurate safety alarm to the user based on the information.

That is, by transmitting a V2I message further including lane closed end segment information, the V2X communication device may provide information about an accurate restricted area of a work zone of each lane to the peripheral V2X communication device. Thereby, user inconvenience according to provision of an inaccurate stable alarm can be solved. In this case, transmission and reception processing of a V2I message in the V2X communication device or a peripheral V2X communication device follows the V2X message processing method described with reference to FIGS. 10 and 11.

FIG. 25 illustrates an application container in a V2I message according to another embodiment of the present invention. In particular, FIG. 25 illustrates a fourth embodiment of an application container in a V2I message for a work zone safety related service (or application) according to an embodiment of the present invention. In the embodiment of FIG. 25, the application container (or work zone container) may be represented based on the ASN.1 method. In the embodiment of FIG. 25, a description corresponding to that in the embodiment of FIGS. 14, 16, and 18 is omitted.

Referring to FIG. 25, the application container may include lane status (laneStatus) information, reference position offset (laneClosOffsets) information, lane closed segment (laneClosOffsets) information, geometry information, and length information and/or worker present (wokersPresent) information of a sequence form. That is, the application container may further include reference position offset information. Here, lane status information, geometry information, length information, and work information is the same as that described in FIG. 14 and therefore a detailed description thereof is omitted. In the embodiment of FIG. 25, it is assumed that lane closed segment information represents a distance from a reference position of each lane to a start point of a closed lane (or lane closed).

Referring to FIG. 25, the application container may include length information of a sequence form instead of single length information of FIG. 14. In this specification, single length information of FIG. 13 may be referred to as first length information, and length information of a sequence form of FIG. 25 may be referred to as second length information.

In an embodiment, the second length information may correspond to a sequence of 'DE_Length', which is a data element defined in the SAE 2735 standard or may be newly defined with reference to the sequence. In this case, the second length information may provide a length of a plurality of work segments according to a size of the sequence. For example, when a size of the sequence is 10, reference position information may provide a length of a work segment of each of 10 lanes.

As described above, each length information may represent a length of a work zone (or working segment). Therefore, when each length information is configured in a sequence form, the length information may provide a length of a plurality of work segments according to a size of the sequence. For example, length information of a sequence form may provide information on a length of a working segment from a reference position of each lane.

FIG. 26 illustrates a method in which a V2X communication device provides work segment related information based on a V2I message according to an embodiment of the present invention. In particular, FIG. 26 illustrates a method in which a V2X communication device provides work zone related information to a peripheral V2X communication device based on a V2X message including the common container of FIG. 13 and the application container of FIG. 25. In FIG. 26, a description corresponding to that described in FIGS. 15, 17, and 19 is omitted.

In an embodiment of FIG. 26, the V2X communication device may provide information about a restricted area of a work zone using single reference position information of a common container and lane closed segment information and length information of a sequence form of an application container. In the embodiment of FIG. 17, it is assumed that lane closed segment information represents a distance from a reference position of each lane to a start point of a closed lane (or lane close).

In the embodiment of FIG. 26, as shown, it is assumed that a construction is performed in a first lane and a second lane, in the first lane, a construction of a length of 200 meters from a reference position is performed, and in the second lane, a construction of a length of 40 meters from a point apart 10 meters from the reference position is performed.

In this case, the V2X communication device may set length information of the first lane (length[1]) to 200, set lane closed segment information (laneClosOffset[1]) of the first lane to 0, set length information (length[1]) of the second lane to 50, and set lane closed segment information (laneClosffset[2]) of the second lane to 10 to display the work segment (or lane closed segment). In this case, length information and lane closed segment information may be a value set in a meter (m) unit.

Thereby, in the case of the first lane, a segment from a reference position to 200 meters may be set to a lane closed segment, and in the case of the second lane, a segment from a reference position to 10 meters may be set to a lane open segment, a segment from 10 meters to 50 meters may be set to a lane closed segment, and a segment from 50 meters to 200 meters may be set to a lane open segment. Therefore, the V2X communication device may provide more accurate information on a restricted area of a work zone to the peripheral V2X communication device, compared to the embodiment of FIG. 15, and the peripheral V2X communication device may provide an accurate safety alarm to the user based on the information.

That is, by transmitting a V2I message further including information of a sequence form, the V2X communication device may provide information on a restricted area of an accurate work zone of each lane to the peripheral V2X communication device. Thereby, user inconvenience according to provision of an inaccurate stable alarm can be solved. In this case, transmission and reception processing of a V2I message in the V2X communication device or the peripheral V2X communication device follows the V2X message processing method described with reference to FIGS. 10 and 11.

FIG. 27 illustrates a screen in which a V2X communication device provides a safety alarm using a V2I message according to an embodiment of the present invention.

In the embodiment of FIG. 27, the V2I message may be a V2I message set in the embodiment of FIG. 15, 17, 19, 21, 24 or 26. Further, in the embodiment of FIG. 27, the V2I message may be a V2I message generated by combining the V2I messages of the above-described embodiments. For example, the common container of the V2I message may include all of single reference position information and reference position information of a sequence form. Further, the application container of the V2I message may include two or more of lane closed segment information, lane closed start segment information, lane closed end segment information, or reference position offset information. According to an embodiment, all combination of the common container and the application container is available.

The V2X communication device, having received the V2I message of the above-described embodiments may provide a safety alarm to the user using the V2I message. As shown in FIG. 27, the V2X communication device may visually provide a security alarm and information (or work zone traffic control information) on a working segment through a navigation screen. Further, the V2X communication device may visually or audibly provide a safety alarm and work zone traffic control information using various output interfaces (e.g., HUD, speaker).

FIG. 28 is a block diagram illustrating a V2X communication device according to an embodiment of the present invention.

In FIG. 23, a V2X communication device 28000 may include a memory 28010, a processor 28020, and an RF unit 28030. Further, the V2X communication device 28000 may further include an input interface 28040 and an output interface 28050. In an embodiment, the input interface 28040 and the output interface 28050 may be an optional configuration. As described above, the V2X communication device may be an On Board Unit (OBU) or a Road Side Unit (RSU) or may be included in an OBU or an RSU.

The RF unit 28030 may be connected to the processor 28020 to transmit/receive a radio signal. The RF unit 28030 may up-convert data received from the processor 28020 with transmission and reception bands to transmit a signal. The RF unit 28030 may include sub-blocks of FIG. 7.

The processor 28020 may be connected to the RF unit 22030 to implement each layer according to an ITS system (or device) or a WAVE system (or device). In other words, the V2X communication device 28000 may implement all or some of a function of the above layers, e.g., an application layer, a facilities layer, a network/transport layer, and an access layer through the processor 28020. That is, the V2X communication device 28000 may perform processing of each layer through the processor 28020.

In an embodiment, the processor 28020 may include a single processing unit for performing a function of the foregoing layers. However, according to the embodiment, the processor 28020 may include a plurality of processing units for performing a function of the foregoing layers. For example, the processor 28020 may include a first processing unit for performing a function of an application layer, a second processing unit for performing a function of a facilities layer, a network/transport layer, and an LLC layer and/or a third processing unit for performing a function of an MAC layer and a physical layer. In an embodiment, the first processing unit may be an application electronic control unit (ECU) for providing a specific application service. Further, the second processing unit may be a DSRC device processor for generation, encoding, and decoding of a V2X message for a specific application service. Further, the third processing unit may be a Dedicated short-range communications (DSRC) radio unit for transmission of wireless data including a V2X message.

The processor 28020 may be configured to perform operations according to the various embodiments of the present invention according to the above-described drawing and description. Further, at least one of a module, data, a program, or software for implementing an operation of the V2X communication device 28000 according to various embodiments of the present invention may be stored at the memory 28010 and be executed by a processor 28020.

The memory 28010 is connected to the processor 28020 to store various information for driving the processor 28020. The memory 28010 may be included in the processor 28020 or disposed outside the processor 28020 and may be connected to the processor 28020 by known means.

The input interface 28040 may input user information. In an embodiment, the input interface may be, for example, a touch pad for receiving a user's touch input and a microphone for receiving the user's voice input. The output interface 28050 may output information. In an embodiment, the output interface may be, for example, a display for outputting visual information and a speaker for outputting auditory information. The V2X communication device may provide a safety alarm according to the embodiment of FIG. 27 through the output interface.

A specific configuration of the V2X communication device 28000 of FIG. 28 may be implemented so that various embodiments of the present invention are applied independently or two or more embodiments are together applied. A processing method of a V2X message such as a V2I message of the V2X communication device 28000 of FIG. 28 may be applied to a description of the above-described specification as well as a description related to FIG. 29 to be described later.

FIG. 29 is a flowchart illustrating a method in which a V2X communication device transmits a V2I message according to an embodiment of the present invention. In the embodiment of FIG. 29, the V2X communication device may correspond to a Road Side Unit (RSU) of an infrastructure or may be included in the RSU.

The V2X communication device (or V2X communication device) may generate a V2I message (S29010). As described above, generation of a V2I message may be performed by a processor of the V2X communication device.

The V2I message may be a message for providing a V2I service, which a service between a vehicle and an infrastructure or a message for a V2I application for providing a V2I service. In an embodiment, the V2I message may include a first container (or common container) including information to be commonly used for a V2I service (or V2I application) and a second container (or application container) including information to be used for a specific V2I service (or specific V2I application).

In an embodiment, the first container may include all or some of information included in the common container of the embodiment of FIG. 13 and/or FIG. 20, and also include a specific combination of information included in a common container of each embodiment.

For example, the first container may include message ID information representing an identifier of a V2I message, event ID information representing an identifier of an event, and reference position information representing a first reference position related to an event. In an embodiment, reference position information may be a sequence of the first reference position related to the event.

In an embodiment, when the specific application is a work zone safety related application, the second container may include all or some of information included in the application container of the embodiment of FIG. 14, FIG. 16, FIG. 18, FIG. 23 and/or FIG. 25 and also include a specific combination of information included in an application container of each embodiment.

For example, the second container may include lane closed segment information representing a distance from a second reference position to an end point of a closed lane, lane closed start segment information representing a distance from a first reference position to a start point of a closed lane and/or reference position offset information representing an offset distance from a first reference position to an actual reference position. In an embodiment, the second reference position may be the same as a first reference position or may be the sum of a first reference position and an offset distance.

The V2X communication device may perform network/transport layer processing of a V2I message (S29020). In an embodiment, at step of processing a network/transport layer, by processing the V2I message based on a Wave Short Message Protocol (WSMP), a WSM message (or packet) may be generated. As described above, the network/transport layer processing may be performed by a processor of the V2X communication device. This is described with reference to FIGS. 10 and 28.

The V2X communication device may perform physical layer processing of a V2I message to generate a signal frame (S29030). In this specification, the signal frame may be referred to as a V2I message frame, a message frame, and a frame. As described above, the physical layer processing may be performed by a processor of the V2X communication device. This is described with reference to FIGS. 7, 10, 11, and 28.

In the embodiment of FIG. 29, the V2X communication device may correspond to a transmitting device for generating a V2I message and transmitting the V2X message to the peripheral V2X communication device. However, the V2X communication device is not limited to the transmitting device. The V2X communication device may correspond to a receiving device for receiving a V2I message and providing a V2I service based on the V2I message. When the V2X communication device is a receiving device, the flowchart of FIG. 29 may be applied as follows.

The V2X communication device may receive a communication signal including at least one signal frame and perform physical layer parsing of a signal frame. In an embodiment, the signal frame may include a V2I message. This is described with reference to FIGS. 7, 10, 11, and 28. The V2X communication device may perform network/transport layer parsing of a WSM packet or an IP packet including a V2I message. This is described with reference to FIGS. 10 and 28. Thereby, the V2X communication device may obtain a V2I message. The V2I communication device may provide a specific V2I service based on a V2I message. This is described with reference to FIG. 27.

In the aforementioned embodiments, the elements and characteristics of the present invention have been combined in specific forms. Each of the elements or characteristics should be considered to be optional unless otherwise described explicitly. Each of the elements or characteristics may be implemented in such a way as to be not combined with other elements or characteristics. Further, some of the elements and/or the characteristics may be combined to form an embodiment of the present invention. The order of the operations described in the embodiments of the present invention may be changed. Some of the elements or characteristics of an embodiment may be included in another embodiment or may be replaced with corresponding elements or characteristics of another embodiment. It is evident that an embodiment may be configured by combining claims having no explicit citation relation in the claims or may be included as a new claim by amendments after filing an application.

The embodiment of the present invention may be implemented by various means, for example, hardware, firmware, software or a combination thereof. In the case of implementations by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

In the case of an implementation by firmware or software, the embodiment of the present invention may be implemented in the form of a module, procedure, or function for performing the aforementioned functions or operations. A software code may be stored in a memory and driven by the processor. The memory may be located inside or outside the processor and may exchange data with the processor by a variety of known means.

It is evident to those skilled in the art that the present invention may be materialized in other specific forms without departing from essential characteristics thereof. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR CARRYING OUT THE INVENTION

It will be apparent to those skilled in the art that various modifications and variations may be made in the present invention without departing from the spirit or scope of the present invention. Therefore, it is intended that the present invention cover modifications and variations of the present invention provided they come within the scope of the appended claims and their equivalents.

In this specification, the entire of apparatus and method inventions are described and a description of the entire of apparatus and method inventions may be complementarily applied.

Various embodiments have been described in the best mode for carrying out the present invention.

INDUSTRIAL APPLICABILITY

The present invention is used in a series of V2X communication field.

It will be apparent to those skilled in the art that various modifications and variations may be made in the present invention without departing from the spirit or scope of the present invention. Therefore, it is intended that the present invention cover modifications and variations of the present invention provided they come within the scope of the appended claims and their equivalents.

The invention claimed is:

1. A method of transmitting a Vehicle-to-Infrastructure (V2I) message of a Vehicle-to-Everything (V2X) communication device, the method comprising:
generating the V2I message for providing a V2I service, which is a service between a vehicle and an infrastructure, wherein the V2I message comprises:
a first container comprising information related to the V2I service, and
a second container comprising information related to a work zone safety related service;
network and transport layer processing the V2I message; and
generating a signal frame by physical layer processing the V2I message,
wherein the first container comprises message ID information representing an identifier of the V2I message, event ID information representing an identifier of an event, and reference position information representing a first reference position related to the event,
wherein the second container further comprises:
1) an index for a lane closed start segment sequence, and
2) an index for a lane closed end segment sequence,
wherein the lane closed start segment sequence includes a value of a distance from the first reference position to a start point of a closed lane in the lane indicated by the index, and
wherein the lane closed end segment sequence includes a value of a distance from the first reference position to an end point of the closed lane in the lane indicated by the index.

2. The method of claim 1, wherein the second container further comprises reference position offset information representing an offset distance from the first reference position to an actual reference position for an obstacle related to the event.

3. The method of claim 2, wherein the second reference position is the same as the first reference position or is the sum of the first reference position and the offset distance.

4. The method of claim 1, wherein the reference position information is a sequence of the first reference position related to the event.

5. The method of claim 1, wherein the network/transport layer processing of the V2I message comprises generating a WSM message by processing the V2I message based on a Wave Short Message Protocol (WSMP).

6. A Vehicle-to-Everything (V2X) communication device, comprising:
a radio frequency (RF) unit including a transceiver for transmitting and receiving a radio signal; and
a processor for controlling the RF unit,
wherein the processor is configured to:
generate a Vehicle-to-Infrastructure (V2I) message for providing a V2I service, which is a service between a vehicle and an infrastructure,
wherein the V2I message comprises:
1) a first container comprising information related to the V2I service, and
2) a second container comprising information related to a work zone safety related service;
network and transport layer process the V2I message; and
generate a signal frame by physical layer processing the V2I message packet,
wherein the first container comprises message ID information representing an identifier of the V2I message, event ID information representing an identifier of an event, and reference position information representing a first reference position related to the event,
wherein the second container further comprises:
1) an index for a lane closed start segment sequence, and
2) an index for a lane closed end segment sequence,
wherein the lane closed start segment sequence includes a value of a distance from the first reference position to a start point of a closed lane in the lane indicated by the index, and
wherein the lane closed end segment sequence includes a value of a distance from the first reference position to an end point of the closed lane in the lane indicated by the index.

7. The V2X communication device of claim 6, wherein the second container further comprises reference position offset information representing an offset distance from the first reference position to an actual reference position for an obstacle related to the event.

8. The V2X communication device of claim 7, wherein the second reference position is the same as the first reference position or is the sum of the first reference position and the offset distance.

9. The V2X communication device of claim 6, wherein the reference position information is a sequence of the first reference position related to the event.

10. The V2X communication device of claim 6, wherein to process the network/transport layer comprises to generate a WSM message by processing the V2I message based on a Wave Short Message Protocol (WSMP).

* * * * *